US012798590B2

(12) United States Patent
Chandra et al.

(10) Patent No.: US 12,798,590 B2
(45) Date of Patent: Nov. 17, 2026

(54) METHOD AND SYSTEM FOR DETECTING LATERAL DRIVING BEHAVIOR

(71) Applicant: Credit Karma, LLC, Oakland, CA (US)

(72) Inventors: Sakshi Chandra, San Francisco, CA (US); Vishal Ravindra, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 274 days.

(21) Appl. No.: 18/115,626

(22) Filed: Feb. 28, 2023

(65) Prior Publication Data

US 2023/0271618 A1 Aug. 31, 2023

Related U.S. Application Data

(60) Provisional application No. 63/314,716, filed on Feb. 28, 2022.

(51) Int. Cl.

| | |
|---|---|
| ***B60W 40/109*** | (2012.01) |
| ***B60W 40/08*** | (2012.01) |
| ***G06N 20/00*** | (2019.01) |

(52) U.S. Cl.

CPC .......... *B60W 40/109* (2013.01); *B60W 40/08* (2013.01); *G06N 20/00* (2019.01); *B60W 2520/125* (2013.01)

(58) Field of Classification Search

CPC ............... B60W 40/109; B60W 40/08; B60W 2520/125; B60W 40/09; G06N 20/00; G06N 3/045; G06N 3/0464; G06N 5/01; G06N 7/01

See application file for complete search history.

(56) References Cited

U.S. PATENT DOCUMENTS

| | | | |
|---|---|---|---|
| 5,673,039 | A | 9/1997 | Pietzsch et al. |
| 5,864,305 | A | 1/1999 | Rosenquist |
| 6,049,778 | A | 4/2000 | Walker et al. |
| 6,055,477 | A | 4/2000 | McBurney et al. |
| 6,064,318 | A | 5/2000 | Kirchner et al. |
| 6,178,374 | B1 | 1/2001 | Moehlenkamp et al. |
| 6,240,364 | B1 | 5/2001 | Kerner et al. |

(Continued)

FOREIGN PATENT DOCUMENTS

| | | | |
|---|---|---|---|
| CN | 108269406 | A | 7/2018 |
| CN | 108431839 | A | 8/2018 |

(Continued)

OTHER PUBLICATIONS

Driver Behavior Profiling using Smartphones (Year: 2013).*

(Continued)

*Primary Examiner* — Ramon A. Mercado

(74) *Attorney, Agent, or Firm* — Dinsmore & Shohl LLP

(57) ABSTRACT

A method for detecting lateral driving behavior can include collecting data from a set of sensors; and determining a set of lateral event outcomes S500. Additionally or alternatively, the method can include any or all of: aggregating data; checking for a set of criteria; determining a set of lateral event features; triggering an action based on the set of lateral event outcomes; and/or any other processes. The method can function to detect and assess the (lateral) driving behavior associated with a user.

20 Claims, 10 Drawing Sheets

(56) References Cited

U.S. PATENT DOCUMENTS 6,826,477 B2 11/2004 Ladetto et al.
6,941,222 B2 9/2005 Yano et al.
7,065,449 B2 6/2006 Brewster et al.
7,532,196 B2 5/2009 Hinckley
7,668,931 B2 2/2010 Parupudi et al.
7,801,675 B2 9/2010 Currie et al.
7,881,868 B2 2/2011 Greene et al.
8,054,168 B2 11/2011 Mccormick et al.
8,264,375 B2 9/2012 Devries
8,290,480 B2 10/2012 Abramson et al.
8,326,257 B2 12/2012 Shiu et al.
8,352,189 B2 1/2013 Scott et al.
8,369,876 B2 2/2013 Bachmann et al.
8,395,542 B2 3/2013 Scherzinger et al.
8,489,330 B2 7/2013 Ellanti et al.
8,498,610 B2 7/2013 Staehlin
8,504,035 B2 8/2013 Shin et al.
8,521,193 B2 8/2013 Paek et al.
8,577,703 B2 11/2013 Mcclellan et al.
8,634,822 B2 1/2014 Silver et al.
8,731,530 B1 5/2014 Breed et al.
8,738,523 B1 5/2014 Sanchez et al.
8,754,766 B2 6/2014 Oesterling et al.
8,912,103 B2 12/2014 Heo et al.
8,971,927 B2 3/2015 Zhou et al.
8,972,103 B2 3/2015 Elwart et al.
8,989,914 B1 3/2015 Nemat-Nasser et al.
8,996,234 B1 3/2015 Tamari et al.
9,064,412 B2 6/2015 Baur
9,121,940 B2 9/2015 Psiaki et al.
9,141,974 B2 9/2015 Jones et al.
9,185,526 B2 11/2015 Guba et al.
9,188,451 B2 11/2015 Magnusson et al.
9,221,428 B2 12/2015 Kote et al.
9,222,798 B2 12/2015 Curtis et al.
9,224,293 B2 12/2015 Taylor
9,250,090 B2 2/2016 Hille et al.
9,311,211 B2 4/2016 Chatterjee et al.
9,311,271 B2 4/2016 Wright
9,360,323 B2 6/2016 Grokop
9,368,027 B2 6/2016 Jang et al.
9,390,625 B2 7/2016 Green et al.
9,414,221 B1 8/2016 Simon et al.
9,423,318 B2 8/2016 Liu et al.
9,449,495 B1 9/2016 Call et al.
9,457,754 B1 10/2016 Christensen et al.
9,467,515 B1 10/2016 Penilla et al.
9,495,601 B2 11/2016 Hansen
9,536,428 B1 1/2017 Wasserman
9,558,520 B2 1/2017 Peak et al.
9,564,047 B2 2/2017 Wu
9,566,981 B2 2/2017 Rebhan et al.
9,587,952 B1 3/2017 Slusar
9,628,975 B1 4/2017 Watkins et al.
9,632,507 B1 4/2017 Korn
9,633,487 B2 4/2017 Wright
9,645,970 B2 5/2017 Boesch et al.
9,650,007 B1 5/2017 Snyder et al.
9,674,370 B2 6/2017 Kim et al.
9,689,698 B2 6/2017 Wesselius et al.
9,716,978 B2 7/2017 Sankaran
9,731,713 B2 8/2017 Horii
9,733,089 B2 8/2017 Choudhury et al.
9,773,281 B1 9/2017 Hanson
9,794,729 B2 10/2017 Meyers et al.
9,800,716 B2 10/2017 Abramson et al.
9,801,027 B2 10/2017 Levy et al.
9,805,601 B1 10/2017 Fields et al.
9,818,239 B2 11/2017 Pal et al.
9,834,222 B2 * 12/2017 Shin .................... B60W 40/10
9,842,120 B1 12/2017 Siris et al.
9,852,475 B1 12/2017 Konrardy et al.
9,854,396 B2 12/2017 Himmelreich et al.
9,868,394 B1 1/2018 Fields et al.
9,870,649 B1 1/2018 Fields et al.
9,888,392 B1 2/2018 Snyder et al.
9,900,747 B1 2/2018 Park
9,932,033 B2 4/2018 Slusar et al.
9,994,218 B2 6/2018 Pal et al.
9,996,811 B2 6/2018 Matus et al.
10,012,993 B1 7/2018 Matus et al.
10,137,889 B2 11/2018 Pal et al.
10,154,382 B2 12/2018 Matus
10,157,423 B1 12/2018 Fields et al.
10,176,524 B1 1/2019 Brandmaier et al.
10,304,329 B2 5/2019 Matus et al.
10,319,037 B1 6/2019 Chan et al.
10,324,463 B1 6/2019 Konrardy et al.
10,386,192 B1 8/2019 Konrardy et al.
10,479,371 B1 * 11/2019 Kim .................... B60W 40/09
10,510,123 B1 12/2019 Konrardy et al.
10,533,870 B1 1/2020 Slusar
10,559,196 B2 2/2020 Matus et al.
10,599,155 B1 3/2020 Konrardy et al.
10,631,147 B2 4/2020 Matus et al.
10,759,441 B1 9/2020 Balakrishnan et al.
10,824,145 B1 11/2020 Konrardy et al.
10,848,913 B2 11/2020 Pal et al.
10,872,525 B2 12/2020 Xu et al.
10,885,592 B2 1/2021 Hsu-Hoffman et al.
10,949,925 B2 * 3/2021 Bowne ............... G06Q 10/0833
10,983,523 B2 4/2021 Sim
11,068,998 B1 * 7/2021 Slusar ................ G01C 21/3461
11,069,157 B2 7/2021 Matus
11,170,446 B1 11/2021 Thurber
11,205,232 B1 12/2021 Chan et al.
11,775,010 B2 10/2023 Matus et al.
2002/0161517 A1 10/2002 Yano et al.
2002/0161518 A1 10/2002 Petzold et al.
2003/0018430 A1 1/2003 Ladetto et al.
2004/0046335 A1 3/2004 Knox et al.
2004/0082311 A1 4/2004 Shiu et al.
2005/0065663 A1 * 3/2005 Oyama .................. G08B 21/06
701/1
2005/0080555 A1 4/2005 Parupudi et al.
2005/0093868 A1 5/2005 Hinckley
2005/0197773 A1 9/2005 Brewster et al.
2005/0288856 A1 12/2005 Ohki et al.
2006/0153198 A1 7/2006 Chadha
2007/0005228 A1 1/2007 Sutardja
2007/0208494 A1 9/2007 Chapman et al.
2007/0208501 A1 9/2007 Downs et al.
2008/0033776 A1 2/2008 Marchese
2008/0103907 A1 5/2008 Maislos et al.
2008/0243439 A1 10/2008 Runkle et al.
2008/0312832 A1 12/2008 Greene et al.
2009/0024419 A1 1/2009 McClellan et al.
2010/0023180 A1 * 1/2010 Huang .................. B60W 40/09
701/1
2010/0030582 A1 2/2010 Rippel et al.
2010/0056175 A1 3/2010 Bachmann et al.
2010/0100398 A1 4/2010 Auker et al.
2010/0106406 A1 4/2010 Hille et al.
2010/0109881 A1 * 5/2010 Eskandarian .......... G08B 21/06
340/576
2010/0131304 A1 5/2010 Collopy et al.
2010/0198517 A1 8/2010 Scott et al.
2010/0219944 A1 9/2010 Mc et al.
2010/0273508 A1 10/2010 Parata et al.
2010/0299021 A1 11/2010 Jalili
2010/0332131 A1 12/2010 Horvitz et al.
2011/0077028 A1 3/2011 Wilkes et al.
2011/0117903 A1 * 5/2011 Bradley ............ H04M 1/72463
455/418
2011/0124311 A1 5/2011 Staehlin
2011/0161116 A1 6/2011 Peak et al.
2011/0224898 A1 9/2011 Scofield et al.
2011/0246156 A1 10/2011 Zecha et al.
2011/0294520 A1 12/2011 Zhou et al.
2011/0320163 A1 * 12/2011 Markkula ........... B60W 40/072
702/150
2012/0050095 A1 3/2012 Scherzinger et al.
2012/0065871 A1 3/2012 Deshpande et al.
2012/0066053 A1 3/2012 Agarwal

(56) References Cited

U.S. PATENT DOCUMENTS

2012/0071151 A1 3/2012 Abramson et al.
2012/0089328 A1 4/2012 Ellanti et al.
2012/0109517 A1 5/2012 Watanabe
2012/0129545 A1 5/2012 Hodis et al.
2012/0136529 A1 5/2012 Curtis et al.
2012/0136567 A1 5/2012 Wang et al.
2012/0149400 A1 6/2012 Paek et al.
2012/0158820 A1 6/2012 Bai et al.
2012/0197587 A1 8/2012 Luk et al.
2012/0214463 A1* 8/2012 Smith ..................... H04W 4/50 455/26.1
2012/0226421 A1 9/2012 Kote et al.
2012/0245963 A1 9/2012 Peak et al.
2012/0259665 A1* 10/2012 Pandhi ................ G07F 17/0057 705/4
2013/0006469 A1 1/2013 Green et al.
2013/0041521 A1 2/2013 Basir et al.
2013/0052614 A1 2/2013 Mollicone et al.
2013/0069802 A1 3/2013 Foghel et al.
2013/0096731 A1 4/2013 Tamari et al.
2013/0124074 A1 5/2013 Horvitz et al.
2013/0130639 A1 5/2013 Oesterling et al.
2013/0144461 A1 6/2013 Ricci
2013/0204515 A1 8/2013 Emura
2013/0211618 A1 8/2013 Jachini
2013/0282264 A1 10/2013 Bastiaensen et al.
2013/0289819 A1 10/2013 Hassib et al.
2013/0302758 A1 11/2013 Wright
2013/0316737 A1 11/2013 Guba et al.
2013/0317860 A1 11/2013 Schumann
2013/0325517 A1 12/2013 Berg
2013/0332357 A1 12/2013 Green et al.
2013/0344856 A1 12/2013 Silver et al.
2014/0038640 A1 2/2014 Wesselius et al.
2014/0046896 A1 2/2014 Potter
2014/0074402 A1 3/2014 Hassib et al.
2014/0081670 A1 3/2014 Lim et al.
2014/0187219 A1 7/2014 Yang et al.
2014/0188638 A1 7/2014 Jones et al.
2014/0197967 A1 7/2014 Modica et al.
2014/0207497 A1 7/2014 Collins et al.
2014/0232592 A1 8/2014 Psiaki et al.
2014/0244150 A1 8/2014 Boesch et al.
2014/0244156 A1 8/2014 Magnusson et al.
2014/0278206 A1* 9/2014 Girod .................. G01P 15/0891 702/141
2014/0288765 A1 9/2014 Elwart et al.
2014/0288828 A1 9/2014 Werner et al.
2014/0358321 A1 12/2014 Ibrahim
2014/0358394 A1 12/2014 Picciotti
2015/0025917 A1 1/2015 Stempora
2015/0046197 A1 2/2015 Peng et al.
2015/0084757 A1 3/2015 Annibale et al.
2015/0087264 A1 3/2015 Goyal
2015/0097703 A1 4/2015 Baur
2015/0112731 A1 4/2015 Binion et al.
2015/0187146 A1 7/2015 Chen et al.
2015/0229666 A1 8/2015 Foster et al.
2015/0233718 A1 8/2015 Grokop
2015/0246654 A1 9/2015 Tadic et al.
2015/0327034 A1 11/2015 Abramson et al.
2015/0329121 A1 11/2015 Lim et al.
2015/0332407 A1 11/2015 Wilson et al.
2015/0334545 A1 11/2015 Maier et al.
2016/0016590 A1* 1/2016 Fernandez Pozo ..... H04W 4/48 702/145
2016/0021238 A1 1/2016 Abramson et al.
2016/0033366 A1 2/2016 Liu et al.
2016/0036964 A1 2/2016 Barfield et al.
2016/0042767 A1 2/2016 Araya et al.
2016/0048399 A1 2/2016 Shaw
2016/0059855 A1 3/2016 Rebhan et al.
2016/0068156 A1 3/2016 Horii
2016/0086285 A1 3/2016 Jordan et al.
2016/0129913 A1 5/2016 Boesen
2016/0133130 A1 5/2016 Grimm et al.
2016/0140404 A1 5/2016 Rosen
2016/0150070 A1 5/2016 Goren et al.
2016/0171521 A1 6/2016 Ramirez et al.
2016/0174049 A1 6/2016 Levy et al.
2016/0189303 A1 6/2016 Fuchs
2016/0189442 A1 6/2016 Wright
2016/0225263 A1 8/2016 Salentiny et al.
2016/0232785 A1 8/2016 Wang
2016/0269852 A1 9/2016 Meyers et al.
2016/0272140 A1 9/2016 Kim et al.
2016/0282156 A1 9/2016 Ott et al.
2016/0311442 A1* 10/2016 Shin ................ B60W 30/18145
2016/0325756 A1 11/2016 Cordova et al.
2016/0328893 A1 11/2016 Cordova et al.
2016/0339910 A1 11/2016 Jonasson et al.
2016/0358315 A1 12/2016 Zhou et al.
2016/0364983 A1 12/2016 Downs et al.
2016/0375908 A1 12/2016 Biemer
2016/0379310 A1 12/2016 Madigan et al.
2016/0379485 A1 12/2016 Anastassov et al.
2016/0381505 A1 12/2016 Sankaran
2017/0034656 A1 2/2017 Wang et al.
2017/0053461 A1 2/2017 Pal et al.
2017/0057518 A1 3/2017 Finegold et al.
2017/0097243 A1 4/2017 Ricci
2017/0103342 A1 4/2017 Rajani et al.
2017/0103588 A1 4/2017 Rajani et al.
2017/0105098 A1 4/2017 Cordova et al.
2017/0115125 A1 4/2017 Outwater et al.
2017/0116792 A1 4/2017 Jelinek et al.
2017/0124660 A1 5/2017 Srivastava
2017/0126810 A1 5/2017 Kentley et al.
2017/0138737 A1 5/2017 Cordova et al.
2017/0164158 A1 6/2017 Watkins et al.
2017/0178416 A1 6/2017 Barreira Avegliano et al.
2017/0178422 A1 6/2017 Wright
2017/0178424 A1 6/2017 Wright
2017/0210323 A1 7/2017 Cordova et al.
2017/0211939 A1 7/2017 Cordova et al.
2017/0232963 A1 8/2017 Pal et al.
2017/0234689 A1 8/2017 Gibson et al.
2017/0241791 A1 8/2017 Madigan et al.
2017/0279947 A1 9/2017 Rajakarunanayake et al.
2017/0289754 A1 10/2017 Anderson et al.
2017/0349182 A1* 12/2017 Cordova ............... H04W 4/027
2017/0369055 A1 12/2017 Saigusa et al.
2017/0371608 A1 12/2017 Wasserman
2018/0061230 A1 3/2018 Madigan et al.
2018/0075309 A1 3/2018 Sathyanarayana et al.
2018/0090001 A1 3/2018 Fletcher
2018/0154908 A1 6/2018 Chen
2018/0158329 A1 6/2018 Benhammou et al.
2018/0165531 A1 6/2018 Sathyanarayana et al.
2018/0174446 A1 6/2018 Wang
2018/0276485 A1 9/2018 Heck et al.
2018/0308128 A1 10/2018 Deluca et al.
2019/0007511 A1 1/2019 Rodriguez et al.
2019/0035266 A1 1/2019 Riess et al.
2019/0047621 A1* 2/2019 Kim ..................... B62D 15/025
2019/0281416 A1 9/2019 Watkins et al.
2019/0295133 A1 9/2019 Hirtenstein et al.
2020/0216078 A1 7/2020 Katz
2021/0049837 A1* 2/2021 Karnik .................... B60R 21/01
2021/0055325 A1* 2/2021 Cordova ................. G01P 15/18
2021/0163016 A1 6/2021 Matus et al.
2021/0309261 A1 10/2021 Rosales et al.
2022/0005291 A1 1/2022 Konrardy et al.
2022/0180448 A1 6/2022 Konrardy et al.
2022/0248178 A1* 8/2022 Lundsgaard ............ H04W 4/40
2022/0292613 A1 9/2022 Risbood et al.
2022/0371603 A1* 11/2022 Kobayashi ........... B60W 40/114
2023/0271618 A1 8/2023 Chandra et al.

FOREIGN PATENT DOCUMENTS

CN 108819841 A 11/2018
DE 3439000 A1 4/1986
DE 102008008555 8/2008

(56) References Cited

FOREIGN PATENT DOCUMENTS

| | | | |
|---|---|---|---|
| DE | 102017221643 | A1 | 7/2018 |
| EP | 0534892 | A1 | 3/1993 |
| EP | 3022705 | A2 | 5/2016 |
| EP | 3638542 | B1 | 1/2022 |
| GB | 2492369 | B | 4/2014 |
| JP | 2000009482 | A | 1/2000 |
| JP | 2002215236 | A | 7/2002 |
| JP | 2005098904 | A | 4/2005 |
| JP | 2007212265 | A | 8/2007 |
| JP | 2009133702 | A | 6/2009 |
| JP | 2011133240 | A | 7/2011 |
| JP | 2013195143 | A | 9/2013 |
| JP | 2013200223 | A | 10/2013 |
| KR | 20130106106 | A | 9/2013 |
| WO | 2004085220 | | 10/2004 |
| WO | 2006000166 | A1 | 1/2006 |
| WO | 2015122729 | A1 | 8/2015 |

OTHER PUBLICATIONS

Robust and ubiquitous smartphone-based lane detection (Year: 2015).*

Lane Change Detection With Smartphones: A Steering Wheel-Based Approach (Year: 2020).*

Online Assessment of Driving Riskiness via Smartphone-Based Inertial Measurements (Year: 2021).*

Combining Machine Learning and Dynamic Time Wrapping for Vehicle Driving Event Detection Using Smartphones (Year: 2021).*

DriveSafe: an App for Alerting Inattentive Drivers and Scoring Driving Behaviors (Year: 2014).*

Aly, Heba, Anas Basalamah, and Moustafa Youssef "Robust and ubiquitous smartphone-based lane detection." Pervasive and Mobile Computing 26 (2016): 35-56. (Year: 2016).*

Heba Aly, Anas Basalamah, Moustafa Youssef, Robust and ubiquitous smartphone-based lane detection, Pervasive and Mobile Computing, vol. 26, 2016, pp. 35-56, ISSN 1574-1192, https://doi.org/10.1016/j.pmcj.2015.10.019. (Year: 2016).*

Goldstein, Gerry , et al., "Method and System for Selectively Initiating Actions in Accordance with a Driver Risk Analysis", U.S. Appl. No. 18/379,495, filed Oct. 12, 2023.

"Credit Karma launches Karma Drive, a simple way to qualify for an auto insurance discount in as few as 30 days", Dec 17, 2020, Credit Karma Press Room, https://www.creditkarma.com/about/releases/credit-karma-launches-karma-drive-a-simple-way-to-qualify-for-an-auto-insurance-discount-in-as-few-as-30-days.

Chu, Hon Lung , "In-Vehicle Driver Detection Using Mobile Phone Sensors", https://ece.duke.edu/sites/ece.duke.edu/files/ GWDD2011_Chu.pdf—2011 (Year: 2011).

Das, Tathagata , et al., "PRISM: Platform for Remote Sensing using Smartphones", In. Proc. Mobisys '10, Jun. 15-18, 2010, San Francisco, USA, pp. 63-76., Jan. 2, 2018 00:00:00.0.

Giuseppe, Guido , et al., "Using Smartphones As a Tool To Capture Road Traffic Attributes", Applied Mechanics and Materials vol. 432 (2013) pp. 513-519.

Jiangqiang , et al., "Driver Pre-Accident Operation Mode Study Based on Vehicle-Vehicle Traffic Accidents", 2011, Publisher: IEEE.

Kalra, Nidhi , "Analyzing Driving and Road Events via Smartphone", International Journal of Computer Applications (0975-8887), vol. 98—No. 12, Jul. 2014, pp. 5-9.

Liang-Bi , et al., "An Implementation of Deep Learning based loV System for Traffic Accident Collisions Detection with an Emergency Alert Mechanism", 2018, Publisher: IEE.

Mohan, Prashanth , et al., "Nericell: Rich Monitoring of Road and Traffic Conditions using Mobile Smartphones", SenSys '08, Nov. 5-7, 2008, Raleigh, North Carolina., Feb. 28, 2018 00:00:00.0.

Pattara-Atikom, W. , et al., "Estimating Road Traffic Congestion using Vehicle Velocity", 2006, Publisher: IEEE.

Short, Jeffrey , et al., "Identifying Autonomous Vehicle Technology Impacts on the Trucking Industry", http://atri-online.org/wp-content/uploads/2016/11/ATRI-Autonomous-Vehicle-Impacts-11-2016.pdf (Year: 2016).

Tathagata, Das , et al., "PRISM: Platform for Remote Sensing using Smartphones", In. Proc. Mobisys '10, Jun. 15-18, 2010, San Francisco, USA, pp. 63-76.

Walter, Debbie , et al., "Novel Environmental Features for Robust Multisensor Navigation", Institute of Navigation GNSS+ 2013, pp. 1-6.

* cited by examiner

METHOD AND SYSTEM FOR DETECTING LATERAL DRIVING BEHAVIOR

CROSS REFERENCE TO RELATED APPLICATIONS

This application claims the benefit of U.S. Provisional Application No. 63/314,716, filed 28 Feb. 2022, which is incorporated herein in its entirety by this reference.

TECHNICAL FIELD

This invention relates generally to the vehicular activity monitoring field, and more specifically to a new and useful system and method for detecting lateral driving behavior in the vehicular activity monitoring field.

BACKGROUND

As mobile user devices continue to evolve and the quality of onboard sensors continues to increase, the use cases for which these sensors can be used continually expands. One such use case is in determining kinematic and trajectory information associated with vehicles in which a mobile user device is present, such as a personal mobile user device of a driver of a vehicle. If available, this information can be useful in numerous applications, such as in the early detection of vehicular accidents, an assessment of a driver's driving behavior, and other applications. Collecting and interpreting the data from mobile user devices has numerous challenges, however, which is compounded by the numerous types of risky driving behavior in which drivers can engage.

Thus, there is a need in the vehicle activity monitoring field to create an improved and useful system and method for detecting lateral driving behavior.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
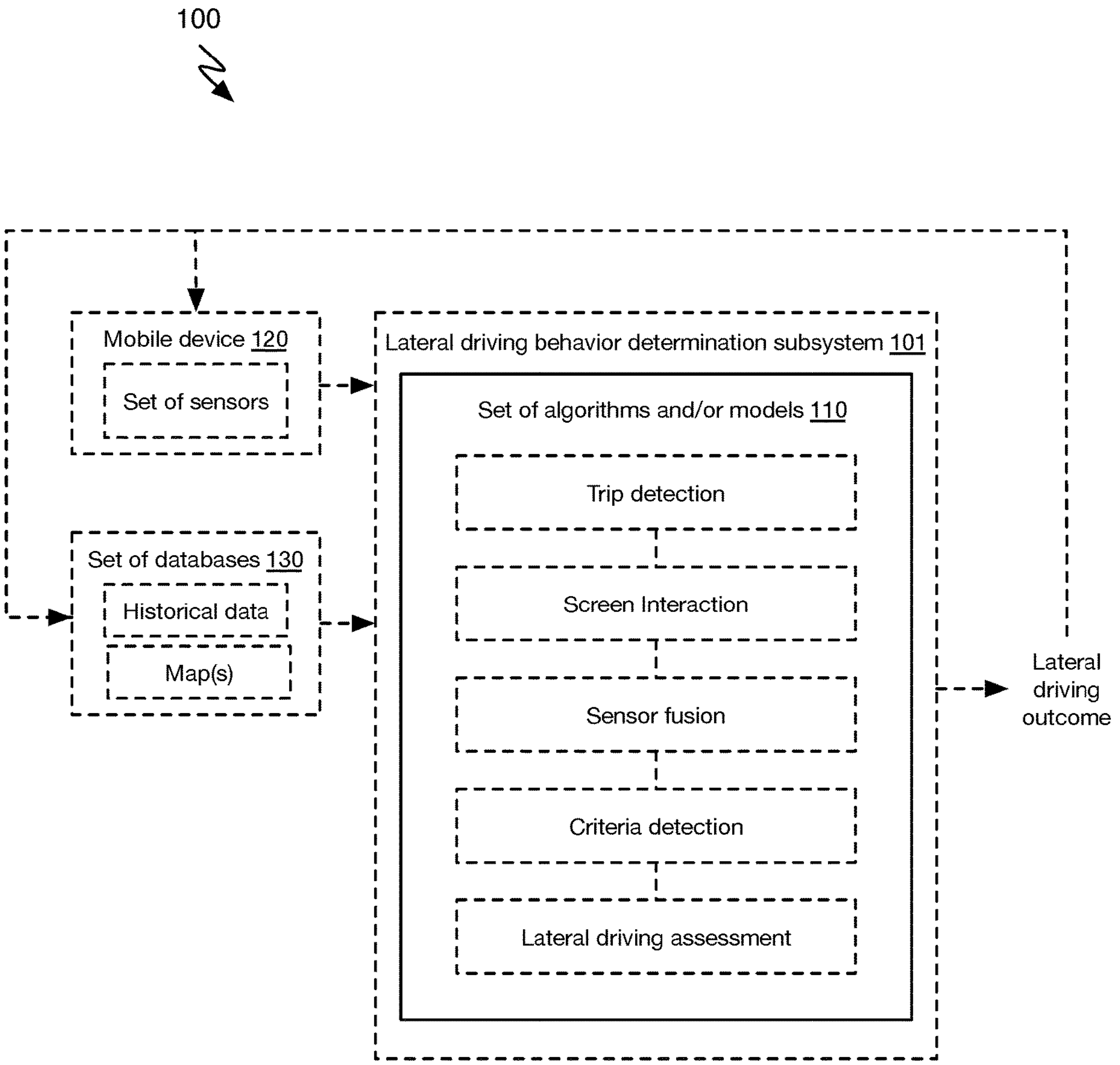
FIG. 1 is a schematic of a system for detecting lateral driving behavior.

As shown in FIG. 1, a system 100 for detecting lateral driving behavior can include any or all of: a set of algorithms and/or a set of models, which individually and/or collectively form a lateral driving behavior determination subsystem. The system can optionally include and/or be used with: a mobile device, a set of computing subsystems and/or processing subsystems (e.g., onboard the mobile device, remote from the mobile device, etc.), and/or any other components. Additionally or alternatively, the system can include or all of the components as described in U.S. application Ser. No. 16/700,991, filed 2 Dec. 2019, U.S. application Ser. No. 17/111,299, filed 3 Dec. 2020, U.S. application Ser. No. 16/022,120, filed 28 Jun. 2018, U.S. application Ser. No. 15/835,284, filed 7 Dec. 2017, and U.S. application Ser. No. 15/243,565, filed 22 Aug. 2016, each of which is incorporated in its entirety by this reference.

Figure 2:
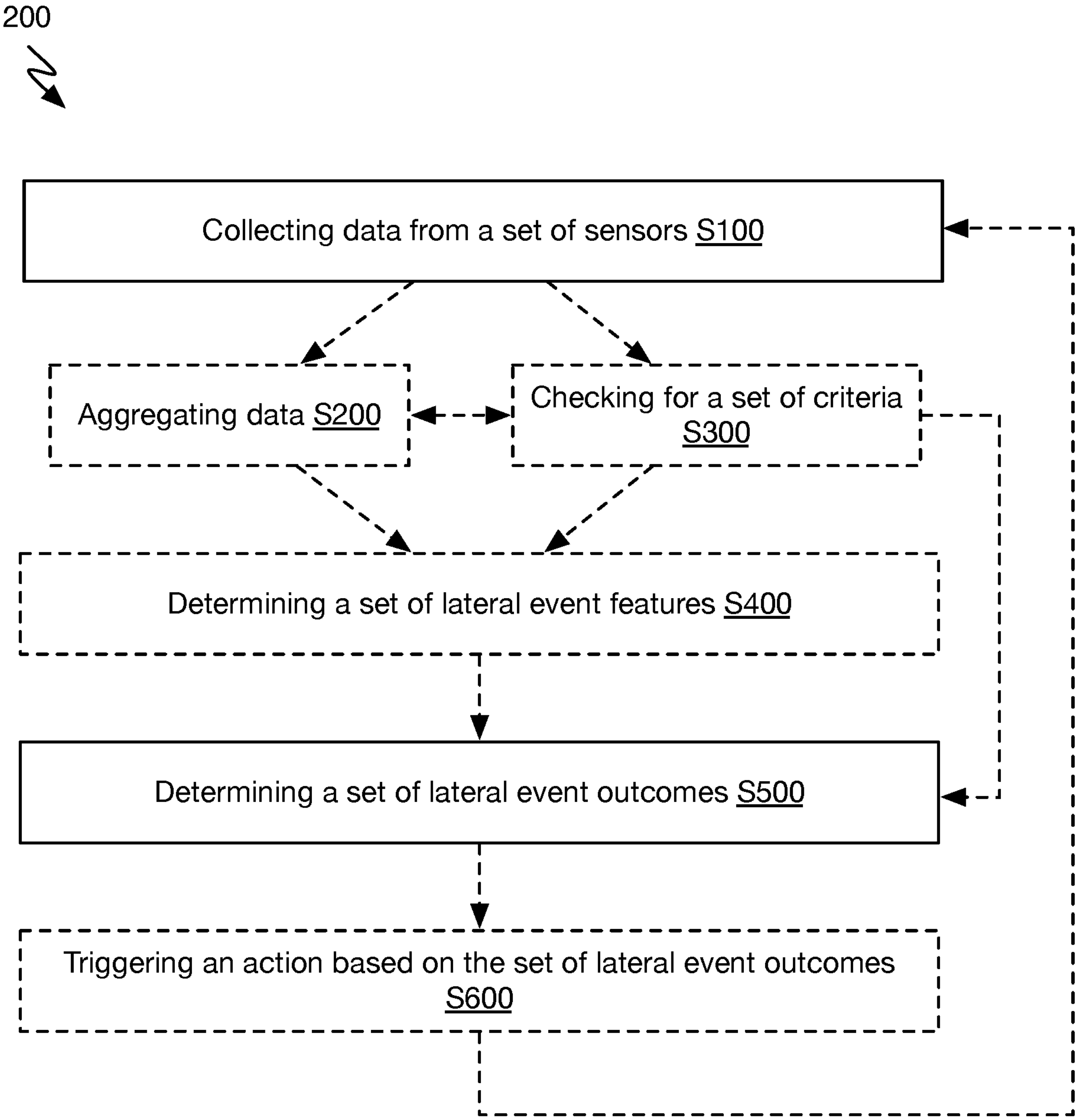
FIG. 2 is a schematic of a method for detecting lateral driving behavior.

As shown in FIG. 2, a method 200 for detecting lateral driving behavior includes collecting data from a set of sensors S100; and determining a set of lateral event outcomes S500. Additionally, or alternatively, the method 200 can include any or all of: aggregating data S200; checking for a set of criteria S300; determining a set of lateral event features S400; triggering an action based on the set of lateral event outcomes S600; and/or any other processes. Further additionally or alternatively, the method 200 can include and/or interface with any or all of the processes as described in U.S. application Ser. No. 16/700,991, filed 2 Dec. 2019, U.S. application Ser. No. 17/111,299, filed 3 Dec. 2020, U.S. application Ser. No. 16/022,120, filed 28 Jun. 2018, U.S. application Ser. No. 15/835,284, filed 7 Dec. 2017, and U.S. application Ser. No. 15/243,565, filed 22 Aug. 2016, each of which is incorporated in its entirety by this reference, or any other suitable processes performed in any suitable order. The method 200 can be performed with a system 100 as described above and/or any other suitable system.

The method 200 can function to detect and assess the (lateral) driving behavior associated with a user, which can be used in numerous ways, examples of which include: determining a driving score for a user (e.g., for use by an insurance company); detecting that a driver is in danger and/or is putting other drivers in danger (e.g., to trigger an emergency response action, etc.), understanding risky roads and/or locations and/or scenarios (e.g., based on aggregated data from multiple drivers), and/or any other use cases.

Lateral deviations and/or lateral accelerations as referenced herein are preferably substantially orthogonal relative to gravity (i.e., orthogonal to a gravity vector; independent of an orientation of the mobile device) and a longitudinal axis of the vehicle (e.g., occurring perpendicular to the longitudinal axis). As an example, lateral accelerations can be aligned with and/or parallel to the rear axle of the vehicle (e.g., where the front axle is a steering axle; where lateral accelerations and heading changes may result from steering adjustments of the front axle). As a second example, lateral accelerations may be substantially perpendicular to a centerline of the road (e.g., where a centerline may be approximated as straight; perpendicular to the tangent of a curving road, etc.). Additionally or alternatively, lateral deviations can reference: angular deviations, steering/heading adjustments, and/or any other suitable deviations associated with vehicle lane changes/swerves. However, the lateral deviations and/or accelerations may be otherwise suitably used and/or referenced herein.

1.1 Illustrative Examples

Figure 7:
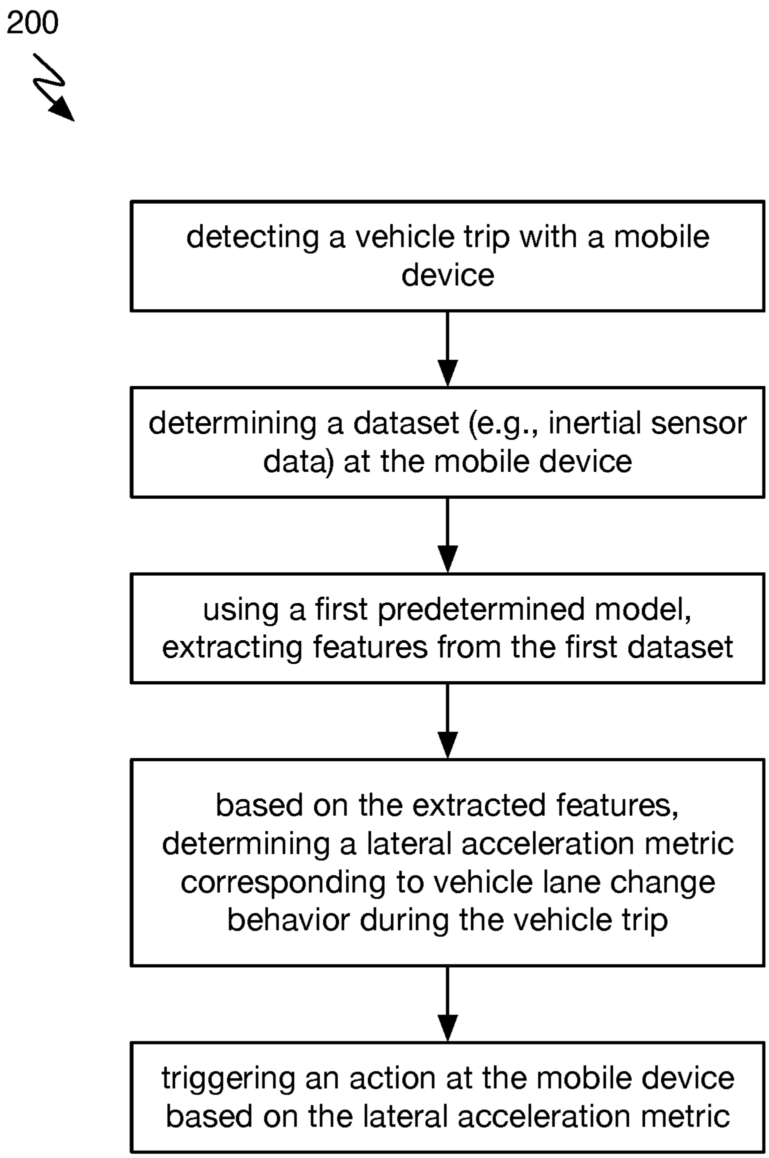
FIG. 7 is a flowchart diagrammatic example of a variant of the method.

In a first set of variants (e.g., an example is shown in FIG. 7), a method can include: detecting a vehicle trip with a mobile user device; at the mobile user device, determining a first dataset which includes movement data collected with at least one inertial sensor of the mobile device; using a first predetermined model, extracting features from the first dataset; based on the extracted features, determining a lateral acceleration metric corresponding to vehicle lane change behavior during the vehicle trip; and based on the lateral acceleration metric, triggering an action at the mobile user device. In a first example, the lateral acceleration metric is associated with a frequency and severity of lane changes. In a second example, the lateral acceleration metric is determined based on an angular velocity or a heading.

Figure 8:
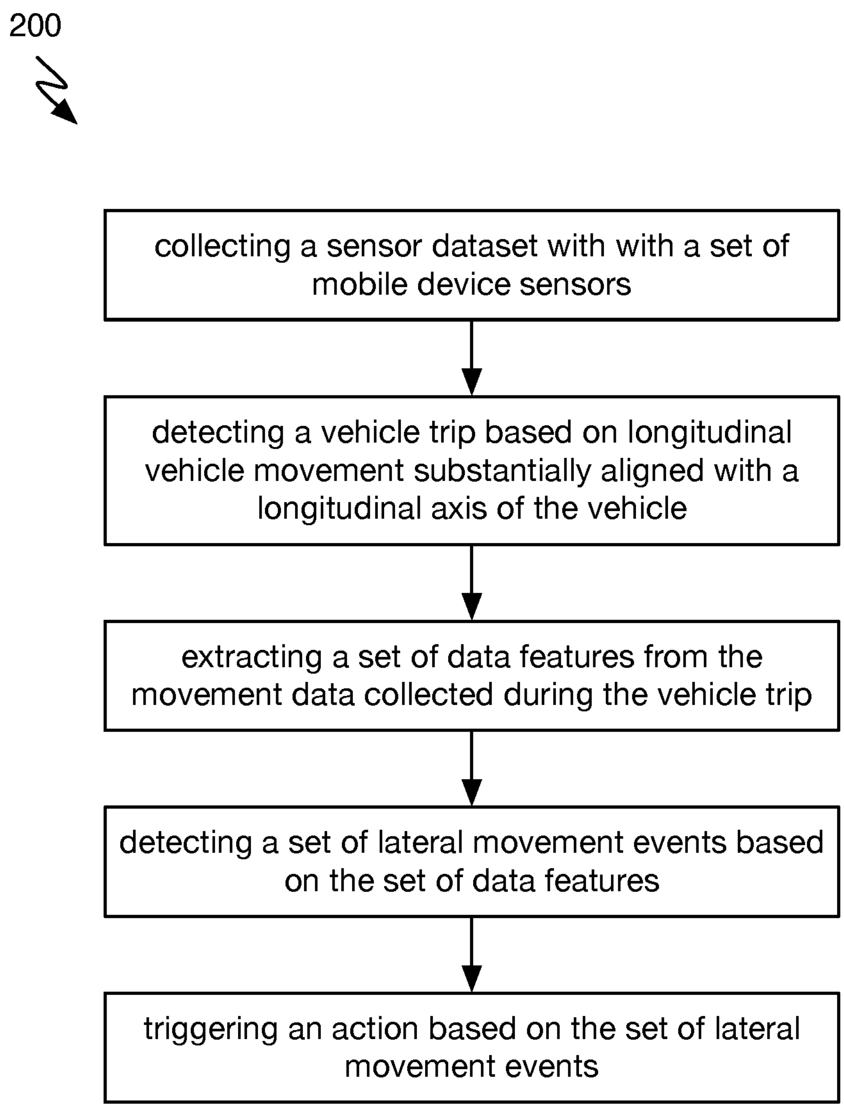
FIG. 8 is a flowchart diagrammatic example of a variant of the method.

In a second set of variants (e.g., an example is shown in FIG. 8), nonexclusive with the first set, a method can include: with sensors of a mobile device, collecting a sensor dataset which includes movement data from at least one inertial sensor of the mobile device; with the sensor dataset, detecting a vehicle trip based on longitudinal vehicle movement substantially aligned with a longitudinal axis of the vehicle; at the mobile device, extracting a set of data features from the movement data during a period of the vehicle trip; detecting a set of lateral movement events based on the set of data features, the lateral movement events associated with lateral deviations relative to the longitudinal vehicle movement; and triggering an action based on the set of lateral movement events.

In one variant of the second set of variants, the set of lateral movement events can include a set of lane change events, wherein detecting each event of the set includes detecting a motion signature of a lane change behavior. In an example of the first variant, the motion signature is a pair of opposite sign lateral accelerations (e.g., in opposing directions, such as left and right; driver-side and passenger-side; etc.). In a second example, the motion signature is a pair of opposite sign lateral accelerations, wherein the pair of opposite sign lateral accelerations occur consecutively and within a frequency bandwidth (e.g., a bounded range of frequencies), wherein high frequency vibrations above the frequency bandwidth are filtered out of the sensor dataset, wherein the motion signature comprises higher-frequency peaks, within the frequency bandwidth, which occurring along a lower-frequency acceleration signal (e.g., below the frequency bandwidth).

In one variant, at least one lateral movement event is detected as a higher-frequency peak within a lower-frequency signal. In an example, the lower-frequency signal corresponds to the lateral acceleration (and/or angular velocity/acceleration) associated with a roadway curvature, wherein the higher-frequency peak corresponds to a lane change maneuver. In a second example, the lateral movement event is a pair of lateral movements (e.g., corresponding to a lane change) which are detected as a pair of higher-frequency peaks (e.g., opposite sign lateral accelerations) within a lower-frequency signal.

2. Benefits

The system and method for detecting lateral driving behavior can confer several benefits over current systems and methods.

First, variants of the system and/or method can confer the benefit of enabling accurate, robust, and/or near-real time detections that a driver has participated in risky driving behavior, and optionally triggering a suitable action in response. This can, include, for instance dynamically detecting that a driver is participating in (and/or has a tendency to participate in) aggressively changing lanes and/or swerving, and taking this behavior into account in determining and/or maintaining one or more scores associated with the driver and/or his or her environment (e.g., particular stretch of road associated with a high incidence of risky lateral driving behavior). In examples, a score associated with a user's driving behavior can be calculated, maintained, and/or used by a car insurance provider of the user (e.g., to determine/adjust the user's monthly premium). In other examples, aggregated data from a set of users can be used to assess the riskiness of particular driving locations (e.g., road segments), such that drivers can be aware of locations at which drivers tend to drive in the riskiest manner. In other examples, determining that a driver is behaving in a risky manner can be used to dynamically alert the driver (e.g., to notify him or her to stop driving in a risky manner) or other users (e.g., other drivers nearby the risky driver, police, etc.). Alternatively, the detection of the lateral driving event can be otherwise used. In some examples, for instance, rather than detecting and/or analyzing lateral events which indicate risky driving, lateral events can be generally detected and/or analyzed for other purposes (e.g., for understanding traffic patterns, detecting locations which serve as bottlenecks, etc.).

Second, variants of the system and/or method can additionally or alternatively confer the benefit of differentiating between types of lateral events, such as distinguishing an aggressive lane change lateral event from a swerving driving behavior. Additionally or alternatively, variations of the system and/or method can confer the benefit of filtering out and/or not detecting similar events which are not of interest. For instance, in some examples (e.g., for use cases in which only risky lateral events are desired to be detected), the system (e.g., algorithms, models, satisfaction criteria, etc.) and/or method can be configured to lateral events which correspond to risky driving behavior while ignoring (e.g., filtering out, identifying and preventing further processing of, etc.) lateral events which are allowed/permitted and/or not associated with higher driving risk (e.g., turning, merging onto/off of a freeway, etc.). This can, in turn, function to prioritize computational resources, calculate accurate scores for assessing driver behavior, and/or confer any other benefits.

Third, variants of the system and/or method can additionally or alternatively confer the benefit of robustly assessing the driving behavior associated with a user based on sensor data collected at a mobile device (e.g., smartphone) in a variety of conditions without explicitly knowing said conditions, such as: when the mobile device is stationary relative to the vehicle, when the mobile device is moving relative to the vehicle, and/or any other conditions.

Fourth, variants of the system and/or method can additionally or alternatively improve the technical fields of at least vehicle telematics, inter-vehicle networked communication, computational modeling of vehicle-related events, and vehicle-related event determination with mobile computing device data. The technology can take advantage of the non-generic sensor data and/or be used with supplemental data (e.g., maps; vehicle sensor data, weather data, traffic data, environmental data, biometric sensor data, etc.) to better improve the understanding of correlations between such data and traffic-related events and/or responses to such events, leading to an increased understanding of variables affecting user behavior while driving and/or riding in a vehicle (e.g., bus, train, etc.) and/or traffic behavior at the scale of a population of users driving vehicles.

Fifth, the technology can provide technical solutions necessarily rooted in computer technology (e.g., automatic data collection via a mobile computing platform, utilizing computational algorithms/models to characterize and/or determine traffic-related events from non-generic sensor datasets collected at mobile computing devices, updating the computational models based on event determination and/or communication accuracy, etc.) to overcome issues specifically arising with computer technology (e.g., issues surrounding how to leverage location data collected by a mobile computing device to accurately determine vehicle-related events, etc.).

Sixth, the technology can leverage specialized computing devices (e.g., computing devices with GPS location capabilities, computing devices with motion sensor functionality, wireless network infrastructure nodes capable of performing edge computation, etc.) to collect specialized datasets for characterizing behavior associated with a driver.

Additionally or alternatively, the system and method can confer any other benefit.

3. System

The system 100, an example of which is shown in FIG. 1, can include a set of algorithms and/or a set of models 110, which can individually and/or collectively form a lateral driving behavior determination subsystem 101. The system can optionally include and/or be used with: a mobile device 120, a set of computing subsystems and/or processing subsystems (e.g., onboard the mobile device, remote from the mobile device, etc.), and/or any other components.

The system 100 preferably functions to collect and/or process data which is used in any or all processes of the method 200. Additionally or alternatively, the system 100 can function to calculate driver behavior metrics, share driver behavior metrics with 3$^{rd}$ party entities (e.g., insurance providers, emergency responders, etc.), and/or can perform any other functions.

The system can include or be used with a mobile device 120 which functions to collect sensor data and/or any other data. Examples of the mobile device include a mobile phone (e.g., smartphone), user device, tablet, laptop, watch, wearable devices, or any other suitable mobile device. The mobile device can include power storage (e.g., a battery), processing systems (e.g., CPU, GPU, memory, etc.), sensors, wireless communication systems (e.g., a WiFi transceiver(s), Bluetooth transceiver(s), cellular transceiver(s), etc.), or any other suitable components. The set of sensors of the mobile device can include movement sensors, which can include: location sensors (e.g., GPS, GNSS, etc.), inertial sensors (e.g., IMU, accelerometer, gyroscope, magnetometer, etc.), motion sensors, force sensors, orientation sensors, altimeters, and/or any other suitable movement sensors; user-facing sensors, which can include: cameras, user input mechanisms (e.g., buttons, touch sensors, etc.), and/or any other suitable user-facing sensors; and/or any other suitable sensors.

Additionally, the set of sensors can include any or all the sensors onboard the mobile device, such as but not limited to, any or all of: inertial sensors and/or motion sensors (e.g., accelerometer, gyroscope, magnetometer, orientation sensor, etc.), which can function to detect any or all of: mobile device movement, mobile device orientation, vehicle movement, vehicle orientation, arrangement of the mobile device within the vehicle (e.g., dash-mounted; in-hand; etc.), and/or any other suitable information; proximity sensors (e.g., optical sensors, capacitive sensors, etc.), which can function to detect and/or classify a user's handling of a mobile device; location sensors (e.g., GPS); any or all of the sensors described above; any or all of the sensors described below; and/or any other suitable sensors. In preferred variations, the set of sensors includes any or all of: a GPS sensor, an accelerometer, a gyroscope, a magnetometer, and a gravity sensor. Additionally or alternatively, the sensor system can include any other suitable sensors.

In a preferred set of variations, the set of sensors includes a set of inertial sensors onboard the mobile device. The set of inertial sensors preferably includes one or more accelerometers (e.g., tri-axial accelerometer), which function to measure the specific forces experienced by the phone (e.g., with respect to an inertial reference frame). In specific examples, the accelerometer includes a tri-axial accelerometer arranged at the center of gravity of the mobile device which records the specific forces experienced by the phone with respect to an inertial reference frame. Additionally or alternatively, the set of inertial sensors can include: one or more gyroscopes; one or more magnetometers; and/or any other inertial sensors. The set of sensors further preferably includes one or more location sensors, such as a GPS receiver onboard the mobile device.

The sensors (e.g., location sensor; GPS/GNSS) of the mobile device can generate data: periodically (e.g., greater than 10 Hz, 10 Hz, 1 Hz, 0.1 Hz, less than 0.1 Hz, any range bounded by the aforementioned values, etc.), aperiodically, in response to a geofence trigger (e.g., every 10 meters, every 100 meters, etc.) and/or other trigger (e.g., minimum speed threshold, etc.), and/or with any other suitable timing/frequency.

However, the system can include and/or be used with any other suitable mobile device(s); and/or can receive location data from any other suitable devices, sources, and/or endpoint(s).

In variants, the system can optionally include or be used with a trip detection system, such as the trip detection system as described in U.S. application Ser. No. 16/201,955, filed 27 Nov. 2018, which is incorporated herein in its entirety by this reference. Accordingly, any or all of the method 200 can be triggered in response to a trip detection by the trip detection system. Additionally or alternatively, the method can be implemented independently of a vehicular trip, asynchronously with vehicle trips and/or vehicular navigation, and/or with any other suitable timing. As an example, trip detection can be based on vehicle movement and/or vehicle traversal (e.g., which is substantially aligned with a longitudinal axis of the vehicle and/or a roadway; above a particular speed; above a threshold speed; longitudinal velocity component above a threshold—where the longitudinal velocity is substantially aligned with a roadway and/or lane/centerline thereof). As an illustrative example, sensor data (e.g., inertial and/or GPS) collected with a mobile device arranged onboard a vehicle can detect a vehicle trip based on the velocity (e.g., substantially aligned with the longitudinal axis of the vehicle) and/or speed of the mobile device as it moves with the vehicle; in-trip lateral accelerations occurring during the trip (e.g., substantially orthogonal to the longitudinal axis and/or direction of traversal; as measured by mobile device sensors) can be separately analyzed to evaluate driver behavior during the trip (e.g., aggressive lane changes, swerves, etc.; in addition to any behavioral analyses based on the longitudinal traversal of the vehicle, such as may be based on longitudinal acceleration, average speed, speed fraction relative to roadway speed limit, etc.).

However, the system can include or be used with any other suitable trip detection system(s) and/or model(s), and/or can be otherwise configured.

In variants, the system can optionally include or be used with the screen interaction system, tap detection system (and/or in-hand versus stationary classification system) and/or method(s) as described in U.S. application Ser. No. 16/700,991, filed 2 Dec. 2019, and/or U.S. application Ser. No. 17/831,731, filed 3 Jun. 2022, each of which is incorporated herein in its entirety by this reference. Accordingly, any or all of the method 200 can be occur for/during portions of a vehicular trip where the mobile device may be classified as 'stationary' relative to the vehicle and/or based on any other suitable period(s) of user interaction (or non-interaction) with the mobile device. For example, the method 200 can be executed for periods of a vehicular trip where the mobile device is arranged in a cup holder, a user's pocket, mounted to the vehicle dash, or otherwise arranged in a substantially stationary position relative to the vehicle (e.g., for the purpose of inertial-derived heading estimation, where inertial signals during in-hand periods may be noisy, etc.). Additionally or alternatively, the method can be implemented independently of any user-interaction or user-behavior classifications, asynchronously with user-interaction with the mobile device, and/or with any other suitable timing. However, the system can include or be used with any other screen interaction (or tap detection) system(s) and/or model(s), and/or can be otherwise configured.

In variants, the system can optionally include or be used with a sensor fusion system, which can function to aggregate data (e.g., in accordance with Block S200) and/or derive vehicle motion parameters (e.g., trajectory, PVA data, etc.; longitudinal speed and acceleration, lateral acceleration, angular velocity, heading/course, etc.) from the set of sensors (e.g., of the mobile device). For example, the sensor fusion system can include a set of Kalman filters (e.g., EKF, etc.) and/or models. Alternatively, the system can include any other suitable sensor fusion systems/modules, and/or can otherwise exclude a sensor fusion system(s) (e.g., where the mobile device can be assumed to be stationary relative to the vehicle). However, the system can include or be used with any other suitable sensor fusion system(s) and/or model(s), and/or can be otherwise configured.

In variants, the system can optionally include or be used with: a criteria detection system, which can function to execute Block S300. For example, the criteria detection system can include a heuristic classifier, decision-tree, and/or rule-based model which checks for a set of criteria and/or facilitates detection/classification of lateral driving events in accordance with the method 200. However, the system can include or be used with any other suitable criteria detection system(s) and/or model(s), and/or can be otherwise configured.

In variants, the system can optionally include or be used with: a lateral driving assessment system, which can function to execute one or more of Block S400, S500 and/or S600 of the method. In a first example, the driving assessment system can be a software module onboard the mobile device (e.g., facilitating executing of method elements S400, S500, and/or S600 onboard the mobile device). In a second example, the driving assessment system can be remote (e.g., facilitating remote assessment of driving behaviors based on the mobile driving data). However, the system can include or be used with any other suitable lateral driving assessment system(s) and/or model(s), and/or can be otherwise configured.

However, the system can include any other suitable set of models/subsystems.

In variants, the system can optionally include or be used with a set of databases, which can include: map data (e.g., route maps, acceleration profiles, etc.), historical data (e.g., historical behavior patterns, historical acceleration data for a set of users in a particular region or driving context), contextual data (e.g., weather data, traffic data, etc.), and/or any other suitable databases or supplemental data. The set of databases can function to facilitate lateral driving behavior determinations and/or criteria detection, evaluation, and/or analysis of (lateral) driving events. However, the system can alternatively access and/or receive data from a remote database, and/or can otherwise be used without a database(s). For example, in variants the system and/or method processes can be entirely local to the mobile device (e.g., edge computing), without requiring access to external data sources/information.

However, the system can additionally or alternatively include any other suitable set of components.

4. Method 200

As shown in FIG. 2, a method 200 for detecting lateral driving behavior includes collecting data from a set of sensors S100; and determining a set of lateral event outcomes S500. Additionally, or alternatively, the method 200 can include any or all of: aggregating data S200; checking for a set of criteria S300; determining a set of lateral event features S400; triggering an action based on the set of lateral event outcomes S600; and/or any other processes. Further additionally or alternatively, the method 200 can include and/or interface with any or all of the processes as described in U.S. application Ser. No. 16/700,991, filed 2 Dec. 2019, U.S. application Ser. No. 17/111,299, filed 3 Dec. 2020, U.S. application Ser. No. 16/022,120, filed 28 Jun. 2018, U.S. application Ser. No. 15/835,284, filed 7 Dec. 2017, and U.S. application Ser. No. 15/243,565, filed 22 Aug. 2016, each of which is incorporated in its entirety by this reference, or any other suitable processes performed in any suitable order.

The method 200 preferably functions to detect and assess the (lateral) driving behavior associated with a user, which can be used in numerous ways, examples of which include: determining a driving score for a user (e.g., for use by an insurance company); detecting that a driver is in danger and/or is putting other drivers in danger (e.g., to trigger an emergency response action, etc.), understanding risky roads and/or locations and/or scenarios (e.g., based on aggregated data from multiple drivers), and/or any other use cases.

In preferred variations of the method, the driving behavior is assessed using only data collected at a mobile device (e.g., user device) of the user, but alternatively any other information (e.g., from an OBD port of the vehicle, from remote sensors, etc.) can be used.

The method 200 is further preferably configured to detect driving behavior which includes lateral events (a.k.a. lateral movement events), with lateral events preferably herein referring to behaviors and/or actions which involve the vehicle moving, accelerating, steering, or otherwise deviating in a lateral direction (e.g., non-parallel with respect to the vehicle's course, perpendicular or substantially perpendicular with respect to the vehicle's heading/trajectory, etc.). These can include, but are not limited to: lane change behaviors and/or actions (e.g., aggressive and/or unsafe lane changing, fast lane changing, high speed and/or high acceleration lane changing, lane changing without signaling, etc.), swerving behaviors and/or actions, driving off-center of a lane (e.g., at the edge of a lane, between lanes, etc.), drifting within and/or out of a lane, and/or any other events involving lateral motion. Additionally or alternatively, the method 200 can detect any other driving behavior.

As an example, lateral movement events can be associated with lateral deviations relative to the longitudinal vehicle movement (e.g., aligned with a lane centerline/path, which the vehicle may substantially tracks by longitudinal movement/traversal; where the direction of longitudinal vehicle movement is substantially aligned with a lane and/or generally tangent to a path of a road; aligned with a longitudinal vehicle axis).

The method 200 is preferably performed with a system 100 as described above, and further preferably with a set of computing and/or processing subsystems (e.g., onboard a mobile device, remote from a mobile device, etc.) configured to execute a set of algorithms and/or models (e.g., which can individually or collectively form a sensor fusion system configured to execute S200 and/or a criteria detection system configured to execute S300 and/or a lateral driving assessment system configured to execute S400, S500, and/or S600). Additionally or alternatively, the method 200 can be performed with any other suitable components and/or system(s).

Figure 5:
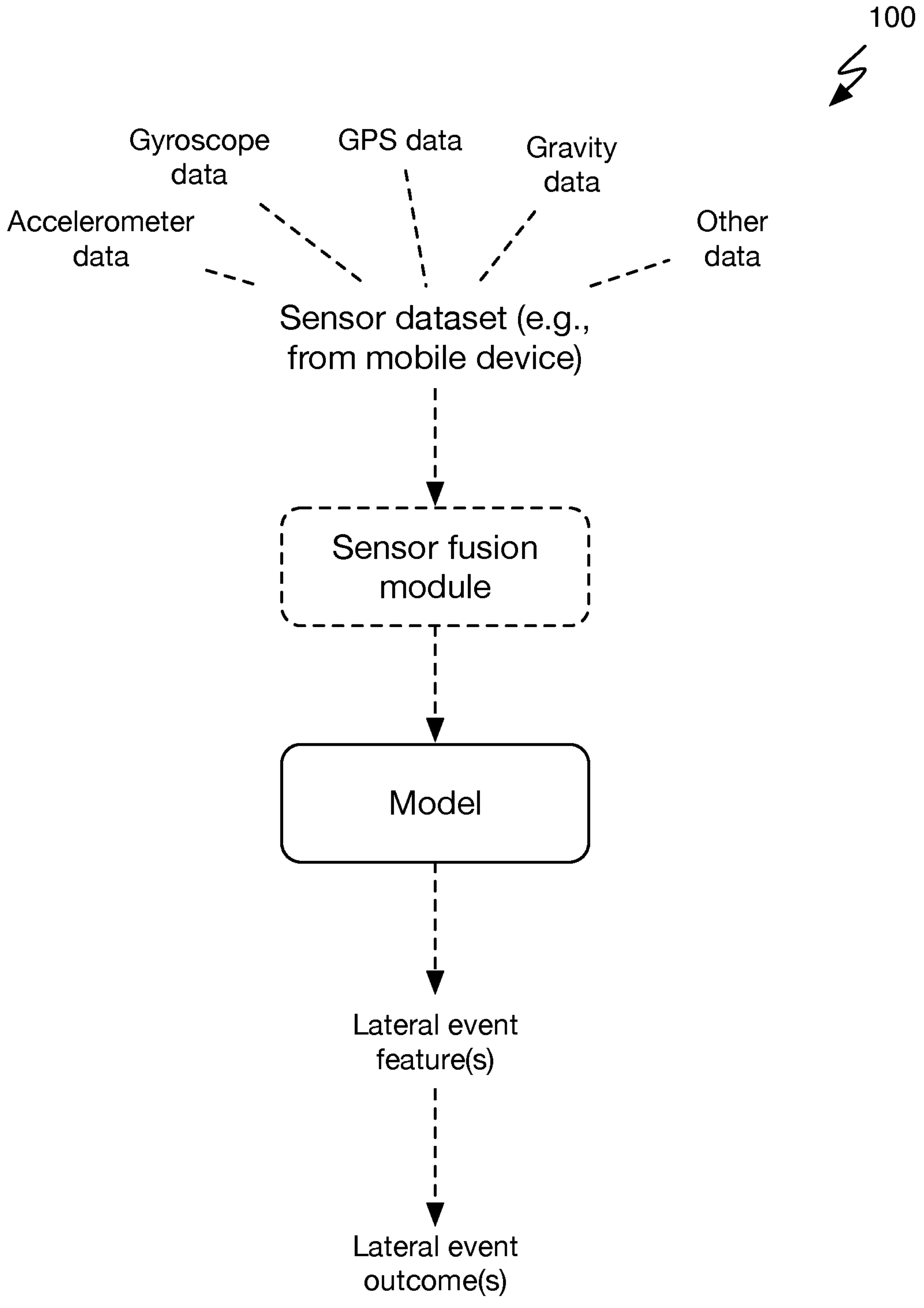
FIG. 5 is a schematic of a variation of the method for detecting lateral driving behavior.

In some variations of the method 200 (e.g., as shown in FIG. 5), any or all of the processes can be performed with and/or in accordance with a set of trained models (e.g., machine learning models, deep learning models, neural networks, etc.).

In variants, all or a portion of method 200 can be executed onboard the mobile device (e.g., processing for each method element can be performed onboard the mobile device and/or the mobile device can include each processing module and/or system element). Additionally or alternatively, method process/elements can be performed at least partially remotely (e.g., at a remote server, cloud computing system, etc.), with centralized or distributed computing nodes (e.g., central processing, distributed processing, etc.). In variants, the method is preferably performed contemporaneously and/or concurrently with a driving trip (e.g., during a driving trip; analyzing driver behavior in real time, near real time, etc.), but various elements can additionally or alternatively be performed asynchronously with a driving trip, periodically (e.g., daily, weekly, monthly, annually, etc.), aperiodically, after and/or in response to completion of a driving trip, and/or with any other suitable timing/frequency.

4.1 Method—Collecting Data from a Set of Sensors S100

The method 200 can include collecting data from a set of sensors S100, which functions to receive information with which to detect and assess driving behavior associated with a user (e.g., a driver). Additionally or alternatively, S100 can perform any other functions.

The sensor data (equivalently referred to herein as telematic data) can include data from any or all of the sensors described above, and/or any other sensors. The sensor data is preferably at least partially received via a software development kit (SDK) and/or a client application executing on the user device, but can additionally or alternatively be received from an OBD-II port (e.g., via a wireless connection, via a wired connection, etc.) and/or from any other sources.

The sensor data is preferably received at a processing system (e.g., as described above) for processing, but can additionally or alternatively be received at any other locations.

S100 can optionally additionally include pre-processing (e.g., filtering, clipping, normalizing, etc.) any or all of the sensor data.

S100 can optionally additionally include receiving one or more inputs from a user and/or any other information from a user. These inputs can be received at a client application executing on the user device, determined based on information from one or more sensors, and/or otherwise received. S100 can further optionally include collecting information from memory, storage, and/or databases, such as historical information (e.g., associated with the user, aggregated from multiple users, etc.), a set of maps, and/or any other sources.

Additionally or alternatively, S100 can include collecting any other information.

In a preferred set of variations, the data in S100 is collected entirely from a mobile device and/or user device of the user. This can have the benefit of enabling easy, fast, and/or uniform data collection among an aggregated set of users, such as through a software development kit (SDK) executing on the mobile device.

In alternative variations, data in S100 can be collected from other devices, databases, memory/storage, and/or any other sources.

4.2 Method—Aggregating Data S200

The method 200 can optionally include aggregating data S200, which functions to determine a set of intermediate outputs with which to inform any or all subsequent processes of the method 200. In some variations, for instance, S200 can function to determine a set of intermediate outputs with which to check for satisfaction of a set of criteria in S300. Additionally or alternatively, S200 can function to determine a set of intermediate outputs with which to determine a set of lateral event features in S400 and/or lateral event outcomes in S500. Additionally or alternatively, S200 can perform any other functions.

S200 is preferably performed in response to and based on S100, but can additionally or alternatively be performed in response to another process of the method 200, prior to and/or during any process of the method, multiple times, and/or at any other times. Alternatively, the method 200 can be performed in absence of S200.

S200 can optionally include performing a sensor fusion process, which functions to aggregate (e.g., fuse) data from any or all of the sensors to determine a set of intermediate outputs. Additionally or alternatively, the sensor fusion process can function to determine a set of metrics associated with the vehicle based on data collected directly at the mobile device. In variations in which the mobile device is moving relative to the vehicle (and/or stationary but rotated relative to the vehicle course), the sensor fusion process can function to determine (e.g., predict, approximate, etc.), the motion of the vehicle such that the user's driving behavior can be accurately assessed.

Each of the set of intermediate outputs is preferably defined for the vehicle, such that the intermediate outputs reflect motion of the vehicle. Additionally or alternatively, any or all of the intermediate outputs can reflect motion of the mobile device.

In some variations (e.g., for lateral event detection), these intermediate outputs include any or all of: a course parameter (e.g., direction of the vehicle relative to earth [e.g., relative to true North], direction of the mobile device relative to earth, etc.), a heading parameter, a speed parameter (e.g., speed of the mobile device and/or vehicle), an angular velocity parameter (e.g., of the mobile device and/or vehicle). For example, S200 can function to separate vehicle movements (e.g., in an earth frame) from mobile device movements (e.g., in a vehicle coordinate frame) by sensor fusion (e.g., with a fusion model and/or a set of EKFs).

In a first set of variations, S200 can implement a fusion model which is configured to separately model multiple states of interest associated with the vehicle, which preferably differ in terms of which reference frame the information is determined relative to, but can additionally or alternatively be otherwise configured. The multiple states of interest produced by the fusion model can include: accelerations with respect to a coordinate frame(s), such as an acceleration of the vehicle with respect to the earth n-frame. The fusion model can further produce as outputs: a location of the vehicle (e.g., with respect to earth), a velocity/trajectory of the vehicle (e.g., with respect to earth), an orientation of the mobile device with respect to the n-frame, and/or any other outputs. Additionally or alternatively, the fusion model can produce a subset of these outputs and/or any other outputs. In one example, the fusion model is a Kalman filter (e.g., extended Kalman filter as described above. Additionally or alternatively, the measurement model, state model, and/or any other components of the filter can be otherwise suitably determined/derived.

In a second set of variations, a set of multiple models can be implemented (e.g., in parallel), which are individually tuned and modeled based on different assumptions. In a first specific example of the second set of variations, the acceleration outputs produced by the multiple models are aggregated in a weighted fashion based on posterior probabilities (e.g., determined with a trained model) of each state being true given observations from any or all of the set of sensors. Additionally or alternatively, position and/or velocity can be produced by the multiple models and aggregated in a weighted fashion. In a second specific example of the second set of variations, the acceleration outputs (and/or velocity and/or position) produced by the multiple models are aggregated in a weighted fashion based on binary weights which are determined based on user information, such as any or all of: a user input of whether or not he had mounted his phone during a trip, historical information associated with the user (e.g., whether or not he has a mount for his phone), and/or any other information. Additionally or alternatively, only the model corresponding to an assumption having a weight of "1" (or the highest weight in non-binary use cases) is processed. In a third specific example of the second set of variations, the acceleration outputs (and/or velocity and/or position outputs) produced by the multiple models are aggregated in a weighted fashion based on weight values determined with a trained model (e.g., machine learning model, deep learning model, etc.).

In variants, S200 can optionally include one or more processes which function to enable any or all of S200 to be performed on the mobile device and/or with limited compute, limited latency, and/or based on any other goals or requirements. In preferred variations, such as those involving Kalman filters or other filters, a smoothing algorithm (equivalently referred to herein as a backward pass algorithm)—which functions to refine estimates of previous states in light of later observations.

Figure 6A:
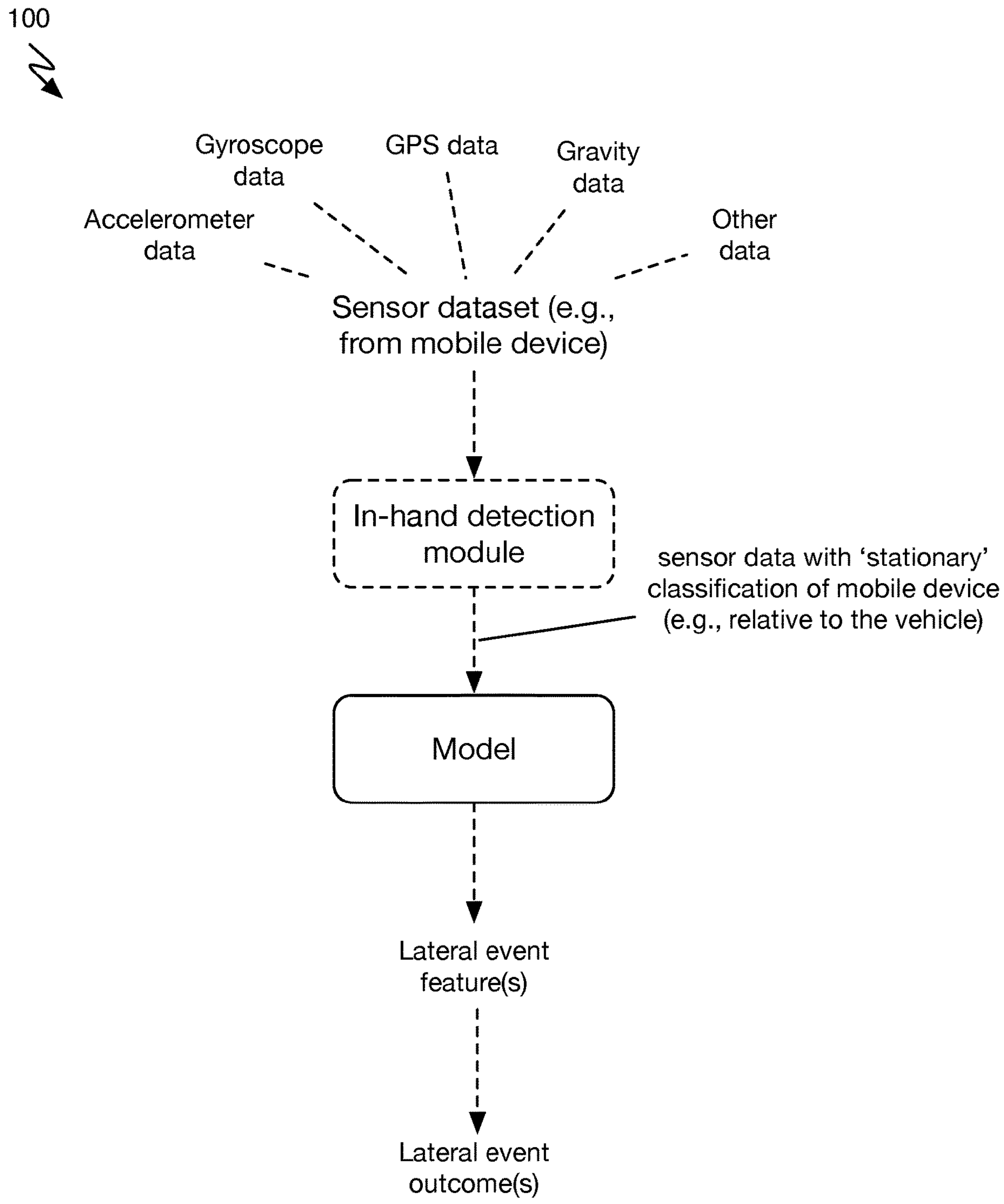
FIG. 6A is a schematic of a system and/or method for detecting lateral driving behavior.
Figure 6B:
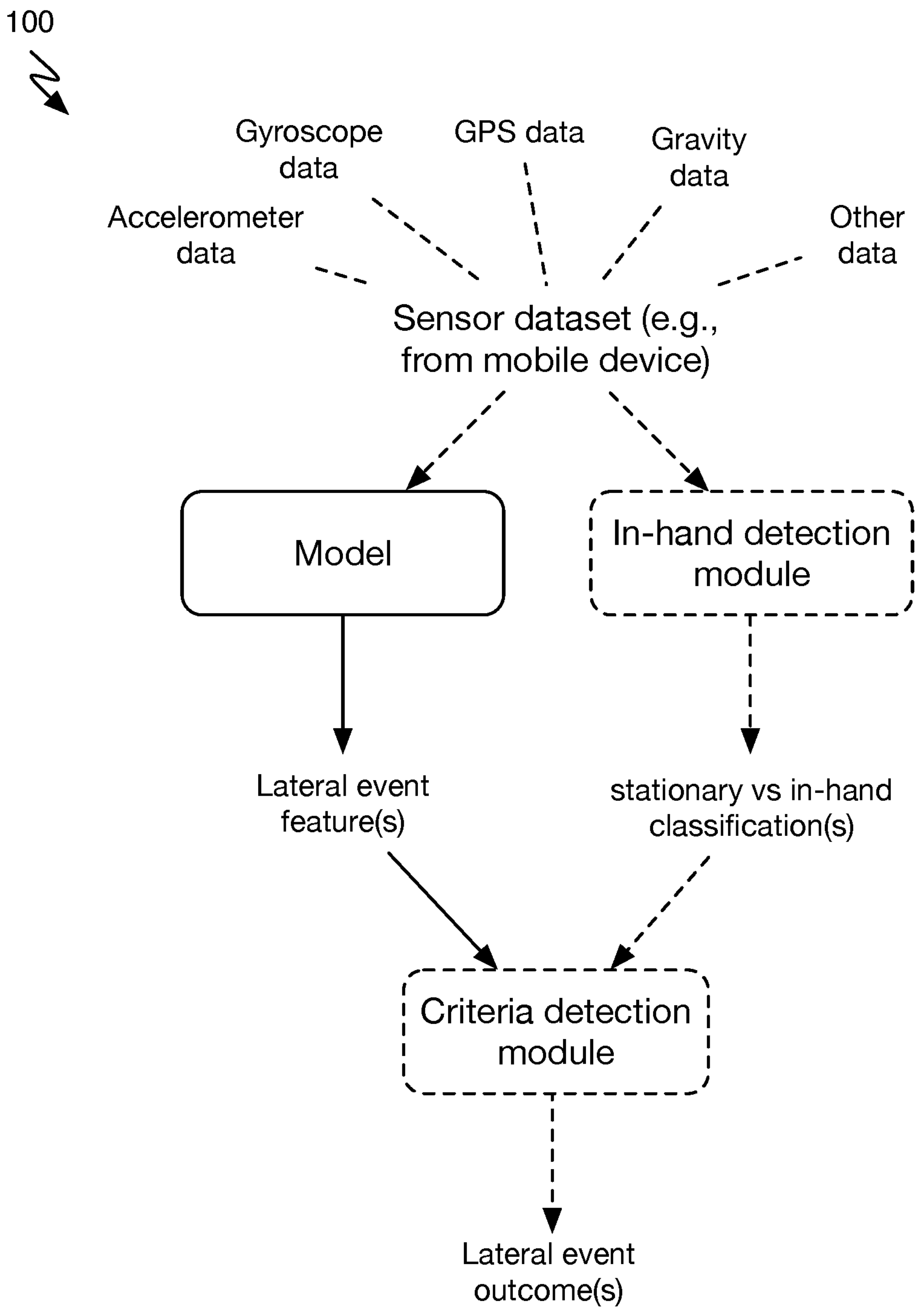
FIG. 6B is a schematic of a system and/or method for detecting lateral driving behavior.

Additionally or alternatively, the mobile device can be assumed to be stationary (relative to the vehicle) during one or more periods of a vehicle trip (e.g., such as when the device may be classified as stationary by an in-hand detection module, examples of which are shown in FIG. 6A and FIG. 6B, and/or screen interaction system; during periods of non-interaction, etc.), periods of device in-hand motion can be filtered-out (e.g., an neglected from consideration in one or more variants of the method) or de-weighted, and/or the relative motion of the device and the vehicle can be otherwise evaluated in method 200. As an alternative example, a set of in-hand motion events associated with user interaction with the mobile user device can be detected (e.g., with the screen interaction and/or in-hand classification system and/or detection methods) and filtered-out (e.g., a portion of the sensor dataset associated with the periods[s] of the detected set of in-hand motion events can be filtered/neglected).

In variants, S200 can optionally additionally or alternatively include aggregating data from multiple users (e.g., for determining an aggregated metric and/or outcome), from multiple time periods (e.g., for a single user), from multiple sources, and/or data can be otherwise aggregated and/or not aggregated.

S200 can additionally or alternatively include any other processes.

4.3 Method—Checking for a Set of Criteria S300

The method 200 can optionally include checking for a set of criteria S300, which functions to inform any or all of the other processes of the method 200 (e.g., whether or not to perform certain processes of the method, which data to use in determining lateral event features and/or outcomes, etc.). Additionally or alternatively, S300 can function to eliminate certain events and/or scenarios from being further processed in the method 200, such as upon detecting that the driving behavior of the vehicle does not correspond to an event of interest (e.g., aggressive lane change, swerve behavior, etc.). This can optionally further function to preserve and/or prioritize computational resources for other processing, prevent a false positive determination of an outcome (e.g., based on an irrelevant event), and/or perform any other functions. Additionally or alternatively, S300 can perform any other functions.

In preferred variations, for instance, S300 functions to determine whether or not the data (e.g., reflective of the user's driving behavior over one or more time steps) is a candidate for detecting an event of interest (e.g., aggressive lane change, swerving, etc.).

S300 can be performed in response to any number of other processes of the method 200, such as, but not limited to: in response to S200, in response to S100, in response to S400 (e.g., wherein criteria are evaluated based on lateral event features), in response to S500 (e.g., wherein criteria are evaluated based on lateral event outcomes), in response to S600 (e.g., wherein criteria are evaluated based on a calculated score), and/or in response to any other processes and/or combination of processes. Additionally or alternatively, S300 can be performed in parallel with any or all of the processes of the method 200, in response to a trigger, prior to any processes of the method 200, multiple times, and/or at any other times.

S300 preferably includes checking for a set of lateral deviation criteria, which functions to detect if a lateral event (e.g., any lateral event, lateral event of interest, lateral deviation, etc.; lane change, swerve, drift from lane center, etc.) has taken place. In a preferred set of variations, upon detecting that any or all of the set of lateral deviation criteria are not satisfied, the remaining processes of the method 200 are not performed. Alternatively, a subset of the subsequent processes is not performed, all processes are performed, and/or any other actions can be triggered.

One or more lateral deviation criteria are preferably configured to detect a motion signature associated with lane change events, such as a sequence of alternating turn directions (e.g., left turn followed by a right turn, right turn followed by a left turn, multiple such maneuvers, any sequence of alternating "turns," etc.), which represent the turning and correcting motions of lane change behaviors, swerving behaviors, and/or any other lateral event behaviors.

A turn can be defined as a lateral deviation in heading and/or course, and can further optionally be defined by minimum and/or maximum angle values in the set of criteria. For instance, in order to detect lane changes and/or swerving, without detecting full turns or other behaviors (e.g., merging onto a freeway, merging off of a freeway, etc.), the set of lateral deviation criteria can additionally or alternatively include checking to see that an angle associated with each of the turning motions falls below a threshold (e.g., 10 degrees, between 5 and 15 degrees, 20 degrees, between 5 and 30 degrees, 30 degrees, 45 degrees, 90 degrees, any range bounded by these values, etc.). Additionally or alternatively, the set of criteria can check to see that the angle(s) exceed a threshold (e.g., to prevent detection of minor corrections of heading/course within a lane).

Additionally or alternatively, any other lateral deviation criteria can be evaluated.

S300 can optionally include checking for a set of criteria which indicate (e.g., determine, predict, etc.) whether or not the mobile device is stationary relative to the vehicle. This preferably functions to determine which data is used to determine a set of lateral features in S400 (e.g., as described below) and/or the lateral outcomes in S500. As an example, S300 can check for a 'stationary' classification output by a screen interaction system/method, such as described in U.S. application Ser. No. 16/700,991, filed 2 Dec. 2019, or U.S. application Ser. No. 17/831,731, filed 3 Jun. 2022, each of which is incorporated herein in its entirety by this reference. Additionally or alternatively, checking for the set of criteria can function to prescribe which intermediate outputs to determine in S200.

These criteria can be checked in parallel and/or substantially in parallel (e.g., overlapping in time, partially overlapping in time, etc.) with the lateral deviation criteria, prior to the checking the lateral deviation criteria (e.g., in response to S100, in response to S200, etc.), after checking the lateral deviation criteria, multiple times, and/or at any other times.

In a first set of variations, checking for whether or not the mobile device is stationary relative to the vehicle is performed in response to S100 and based on sensor data (e.g., raw sensor data, gravity and/or gyroscope data, etc.) collected at the mobile device. In a second set of variations, this determination is made based on one or more intermediate outputs produced by a sensor fusion process.

In a second set of variations, nonexclusive with the first, S300 can include checking for a motion signature associated with a lane change behavior (e.g., checking for or comparing against a motion signature of a lane change behavior, where lateral events are detected based on the presence of the motion signature). In an example, the motion signature is a pair of opposite sign lateral accelerations. In a second example, the motion signature is a pair of opposite sign lateral accelerations, wherein the pair of opposing accelerations (e.g., steering left and then right, which results in a counterclockwise acceleration and rotation followed by a clockwise rotation and acceleration) occur consecutively and within a frequency bandwidth, wherein high frequency vibrations above the frequency bandwidth are filtered out of the sensor dataset (e.g., neglecting high frequencies such as may be generated from a phone vibrating within a cupholder or in response to receiving a text message, for example; such as vibrations with a frequency above: 50 Hz, 100 Hz, 1000 Hz, etc.; low-pass filter), wherein the motion signature comprises higher-frequency peaks, within the frequency bandwidth, which occurring along a lower-frequency acceleration signal (e.g., below the frequency bandwidth; lateral acceleration signal associated with the vehicle tracking the road curvature, etc.; high-pass filtering, band-pass filter, etc.).

In one variant, at least one lateral movement event is detected as a higher-frequency peak (and/or a pair of higher frequency peaks of opposite sign) within a lower-frequency signal. In an example, the lower-frequency signal corresponds to the lateral acceleration (and/or angular velocity/acceleration) associated with a roadway curvature, wherein the higher-frequency peak corresponds to a maximal acceleration(s) and/or angular speed of a lane change maneuver (e.g., in both a clockwise and counterclockwise direction; steering towards an adjacent lane and counter-steering upon reaching the adjacent lane).

Additionally or alternatively, any other criteria can be checked for and/or otherwise suitably used.

4.4 Method—Determining a Set of Lateral Event Features S400

The method 200 can include determining a set of lateral event features S400, which preferably functions to determine features with which to determine and/or assess (e.g., determine a severity of) a set of lateral event outcomes. Additionally or alternatively, S400 can function to determine information with which to compare with a set of criteria (e.g., in S200), determine information with which to trigger one or more processes of the method 200, and/or can perform any other functions.

S400 is preferably performed in response to and based on S300, but can additionally or alternatively be performed in response to another process of the method 200, prior to any other process of the method 200, during any process of the method 200, multiple times during the method 200, and/or at any other time(s) during the method 200. Alternatively, the method 200 can be performed in absence of S400.

Figure 3:
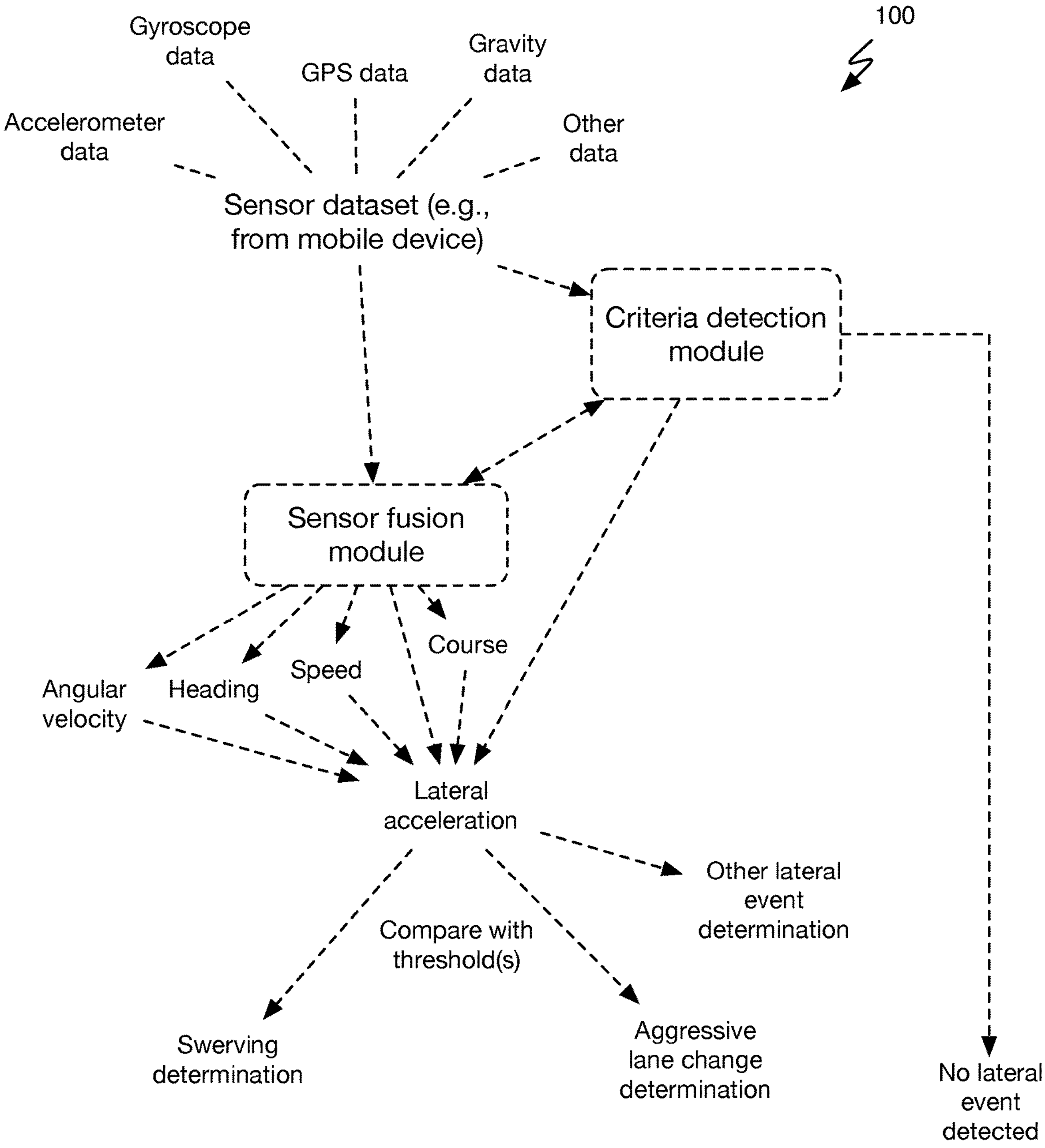
FIG. 3 is a schematic of a variation of the method for detecting lateral driving behavior.

The set of lateral event features preferably includes a lateral acceleration metric (e.g., lateral acceleration of vehicle) (e.g., as shown in FIG. 3), which can be used to determine/characterize (and/or serve as a proxy for) how aggressive, risky, and/or unsafe a lateral event (e.g., lane change, lateral deviation, etc.) may be. Additionally or alternatively, the set of lateral event features can include any other metrics, a combination of metrics, and/or any other information. As an example, the lateral acceleration metric can be associated with a frequency and severity of lane changes.

The lateral acceleration metric (and/or any other lateral event features) can be determined in any number of ways and based on any suitable data and/or metrics, such as, but not limited to, any or all of: a heading of the vehicle, a set of locations of the vehicle such as represented as a course (e.g., trajectory) of the vehicle, an angular velocity of the vehicle, a speed of the vehicle, derivatives of these metrics, any of these metrics relative to the mobile device, and/or any other metrics.

In some variations, the way in which the metric(s) are determined is dependent (at least in part) based on the results of S300, such as based on a determination of whether or not the phone is stationary relative to the vehicle.

Figure 4A:
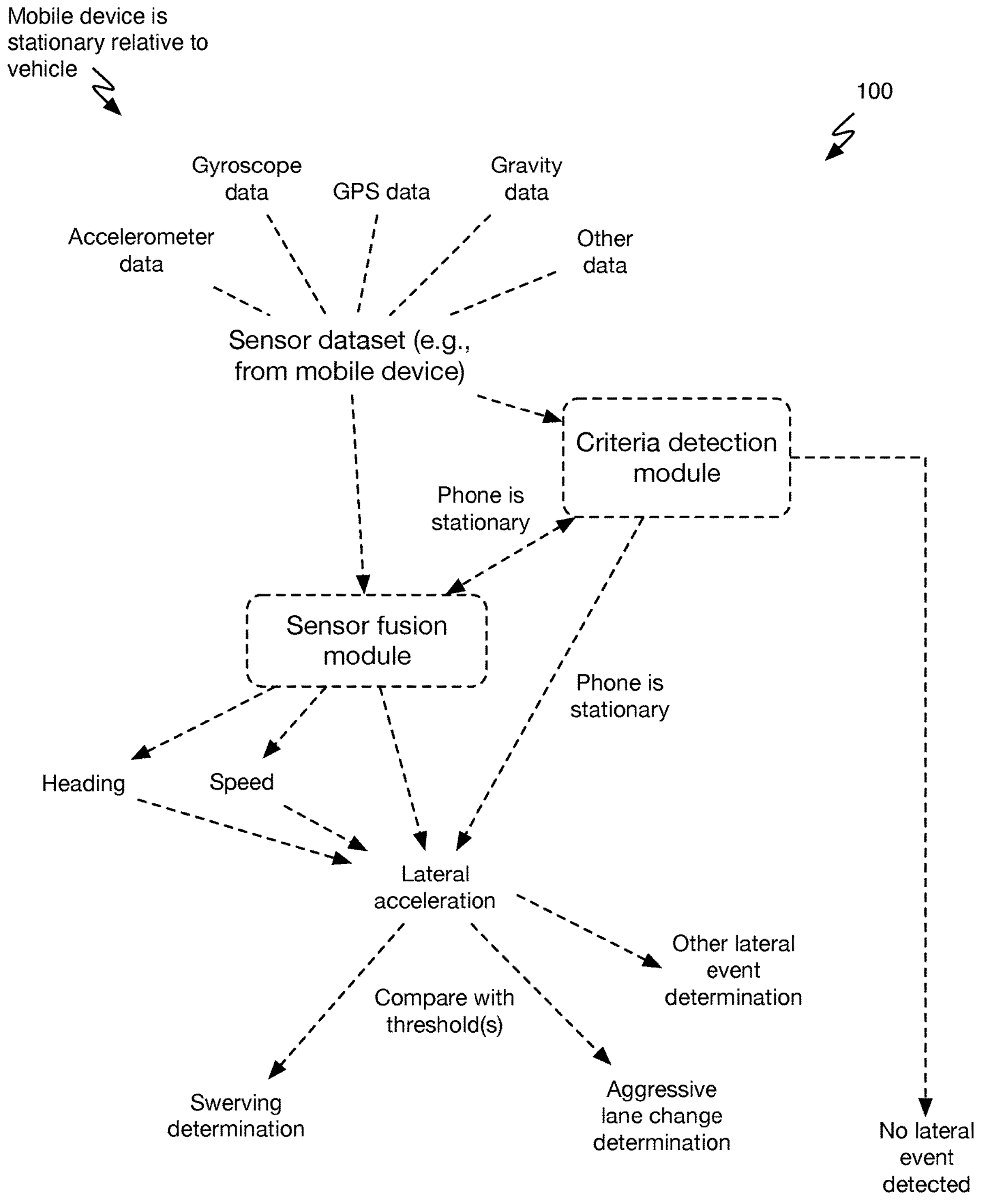
FIGS. 4A-4B depict examples of the method for detecting lateral driving behavior.

In a first set of specific examples, the lateral acceleration is determined based on a heading of the mobile device (and/or heading of the vehicle as determined based on the heading of the mobile device) and a speed of the vehicle (e.g., speed multiplied by a derivative of heading). The first set of specific examples can optionally be triggered in response to (and/or based on) detecting that the mobile device is stationary relative to the vehicle (e.g., as shown in FIG. 4A), which can have the benefit of enabling a higher resolution and/or more accurate calculation of lateral acceleration to be determined (e.g., as a heading metric can be of higher resolution than a course metric). Alternatively, the lateral acceleration can be calculated in this way based on other determinations, in absence of a determination, and/or otherwise determined.

Figure 4B:
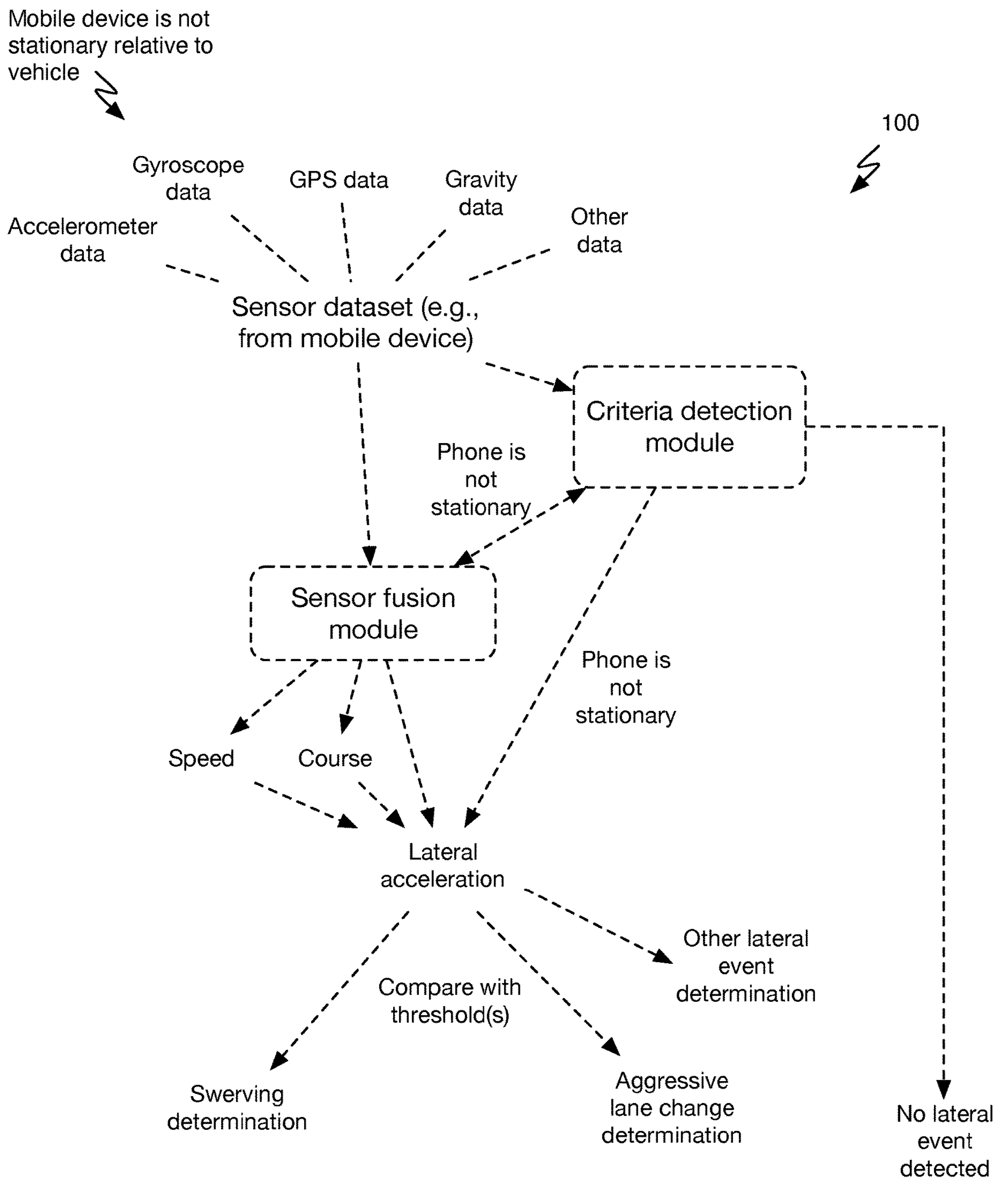

In a second set of specific examples, the lateral acceleration is determined based on a set of locations (e.g., course/trajectory) of the vehicle and a speed of the vehicle (e.g., speed multiplied by a derivative of course). The second set of specific examples can optionally be triggered in response to (and/or based on) detecting that the mobile device is moving relative to the vehicle (e.g., in which case a heading metric may not be accurate and/or usable) (e.g., as shown in FIG. 4B). Alternatively, the lateral acceleration can be calculated in this way based on other determinations, in absence of a determination, and/or otherwise determined.

In a third set of specific examples, the lateral acceleration is determined based on angular velocity and speed. Additionally or alternatively, an angular velocity can supplement the determination of lateral acceleration in the first and/or second specific examples.

In a fourth set of specific examples, the lateral acceleration is determined based on any or all of the inputs described above, such as with a trained model (e.g., machine learning model) and/or as an output of a sensor fusion process.

Additionally or alternatively, a lateral acceleration metric can be determined in absence of a determination of whether or not the phone is stationary, based on any other criteria, and/or otherwise suitably determined.

The set of lateral event features can optionally additionally include one or more temporal features, such as a frequency of occurrence of the lateral event, a duration of the lateral event, and/or any other features. In some variations, for instance, if a change in lateral acceleration occurs frequently (e.g., within a short time period), a determination in S500 can be made that the driver has been swerving (e.g., rather than engaging in a single lane change).

The lateral event features (and/or lateral acceleration metric[s] associated therewith) can be determined using one or more predetermined models[s] (e.g., a lateral driving assessment model; of the set of models no). For example, lateral event features can be extracted from mobile device sensor data (e.g., collected during S100 and/or aggregated during S200) with a classification model (e.g., pretrained and/or predetermined) which can include one or more: a binary classifier, a multi-class classifier, a neural network model (e.g., DNN, CNN, RNN, etc.), a logistic regression model, Bayesian networks (e.g., naïve Bayes model), a cascade of neural networks, compositional networks, Markov chains, decision trees, predetermined rules, probability distributions, heuristics, probabilistic graphical models, and/or other models.

Lateral event features (interchangeably referenced herein with "derived signals") can relate a set(s) of sensor data which can include: time domain data, frequency domain data, localization data, motion data, user behavior data (e.g., device utilization, screen interaction, etc.), and/or any other suitable sensor data and/or mobile device data. Lateral event features can be extracted from a single sensor or a combination of multiple sensors (e.g., multiple sensor types, such as an accelerometer and a gyroscope; GPS fused with inertial sensing, etc.). Lateral event features can be generated algorithmically according to a predetermined set of rules/heuristics (e.g., manually assigned, pre-generated by a computer, etc.), using one or more pre-trained models (e.g., machine learning [ML] models, neural networks, fully convolutional network [FCN], convolutional neural network [CNN], recurrent neural network [RNN], artificial neural network [ANN], etc.), polynomial regression, and/or with any other suitable techniques. Features can be constructed from time segments of sensor data spanning: a full duration of a vehicle trip, a partial duration of a vehicle trip (e.g., between trip detection and/or initiation and an instantaneous time, dynamic time window between screen interactions, etc.), and/or any other suitable duration(s). More preferably, the lateral event features can include in-trip lateral events (e.g., associated with a time period of vehicular traversal and/or a duration of the vehicular trip), but can additionally or alternatively include or be evaluated in conjunction with pre-trip/post-trip features (e.g., entry/egress characteristics), supplemental classifications surrounding the trip (e.g., whether the user is a driver or a passenger), and/or any other suitable data features. The set of features is preferably fixed and/or predefined (e.g., based on a set of inputs used to train/update the models).

Additionally, the data features used to evaluate lateral driving events and/or used to determine lateral event outcomes can include any or all of the features determined/extracted as described in U.S. application Ser. No. 18/073,959, filed 2 Dec. 2022, U.S. application Ser. No. 17/959,067, filed 3 Oct. 2022, U.S. Provisional Application Ser. No. 63/285,650, filed 3 Dec. 2021, and/or U.S. application Ser. No. 17/474,591, filed 14 Sep. 2021, each of which is incorporated herein in its entirety by this reference.

Lateral event features are preferably generated at a local processor of the mobile device but can alternatively be generated at a remote processor and/or at any other suitable processing endpoint. In one variant, all features can be generated locally at the user device. Features can be generated/updated: continuously (e.g., during a trip), periodically, aperiodically, in response to satisfaction of a trigger condition (e.g., time trigger, speed threshold, etc.), during a vehicle trip (e.g., during movement of the mobile device within a vehicle, between detection of a vehicle trip and satisfaction of a trip termination condition), and/or with any other suitable timing.

In one example, the lateral acceleration metric is determined with a pretrained machine learning (ML) classifier at the mobile user device.

In one example, the lateral acceleration metric is determined based at least in part on an angular velocity (e.g., of the vehicle) and/or a heading (e.g., of the vehicle).

However, any other suitable features can be extracted and/or generated. Additionally or alternatively, the set of lateral event features can include any other features and/or be determined in any other suitable way(s) and based on any suitable metric(s).

4.5 Method—Determining a Set of Lateral Event Outcomes S500

The method 200 can include determining a set of lateral event outcomes S500, which functions to make a determination of a particular driving behavior associated with the user.

S500 can optionally be performed in response to S400, wherein the set of lateral events and/or lateral event outcomes are determined, at least in part, based on a set of lateral event features determined in S400. Additionally or alternatively, S500 can be performed in absence of S400, in response to and/or based on another process of the method 200, prior to any process of the method 200, during any process of the method 200, multiple times, and/or at any other times.

The set of lateral event outcomes can include any or all of: a binary determination/classification (e.g., indicating a determination of whether or not the driver has participated in a lateral driving event), a severity score (e.g., level of risk, level of danger, level of responsibility of the user, etc.) of the lateral event, a classification (e.g., a type of lateral driving event the driver has participated in, such as a swerve, lane change, multi-lane change, etc.), an event frequency (e.g., indicating how commonly a user participates in the driving event, such as may be used to evaluate whether or not it is a persistent habit), and/or any other determinations. As an example, determining the set of lateral event outcomes can include determining a severity score for the set of lateral (movement) events based on a magnitude of lateral deviation (e.g., lateral acceleration).

The set of lateral event outcomes is preferably determined based on a set of lateral event features (e.g., as determined in S400), but can additionally or alternatively be determined based on any other information (e.g., data received in S100, data aggregated in S200, etc.), in absence of a set of lateral event features, any combination of information, and/or otherwise suitably determined.

In a preferred set of variations, for instance, the set of lateral event outcomes preferably includes any or all of: a determination of whether or not one of a set of lateral events has occurred, a categorization of the type of lateral event that has occurred, a level of risk associated with the lateral event, and/or any other outcomes.

Determining any or all of the set of lateral event outcomes preferably includes comparing any or all of the set of lateral event features (and/or raw data received in S100, aggregated data produced in S200, etc.) with a set of thresholds, such as, but not limited to, any or all of: a minimum heading/course change threshold, a maximum heading/course change threshold, a minimum lateral acceleration threshold, a maximum lateral acceleration threshold, a minimum frequency threshold, a maximum frequency threshold, and/or any other thresholds. The thresholds can be any or all of: static, dynamic, and/or any combination thereof. In some variations, for instance, any or all of the thresholds (e.g., lateral acceleration threshold) reflect and/or are dynamically determined based on any or all of: the speed limit at the location of the vehicle, the road geometry (e.g., to what degree the road is banked, curvatures of the road, etc.; determined from a map and/or a path of the vehicle), road scenarios (e.g., intersections, freeways, residential roads, etc.), traffic conditions, and/or any other information.

S500 preferably includes comparing a lateral acceleration with a set of one or more magnitude thresholds, which characterizes a lateral event (e.g., lane change) as aggressive (e.g., risky, dangerous, unsafe, etc.) if it exceeds the threshold (e.g., a lateral acceleration threshold of between 0.2-0.4 g, a lateral acceleration threshold of greater than 0.2 g, etc.). The set of magnitude thresholds can additionally or alternatively function to distinguish lateral events. For instance, a lateral event of swerving can be distinguished from a lane change if it is below a maximum lateral acceleration threshold (and optionally above another minimum threshold).

S500 can optionally additionally or alternatively include comparing one or more temporal features with a set of thresholds. For instance, a swerving lateral event can be detected if a certain number of lateral acceleration events occurs within a predetermined threshold, such as by: exceeding a minimum frequency threshold, falling below a minimum duration between lateral acceleration events, and/or any other thresholds.

In variants, lateral event outcomes can be determined using a classifier, such as a pretrained ML classifier, decision trees (e.g., boosted decision tree), GBM, heuristic classifiers (e.g., rule-based classification), and/or other suitable classifier or classification technique(s). In some variants, lateral event outcomes can be determined in conjunction with the lateral event features and/or by the same process (e.g., using the same classification technique[s]/processes[s]; as another model output, etc.) and/or separately (e.g., by a subsequent downstream process/determination, by a different process etc.).

In variants, S500 can include determining/detecting a set of lateral events based on the presence of a motion signature (e.g., independently or and/or in conjunction with S300). For example lateral events can be determined based on the presence of a (lateral) motion signature associated with a lane change behavior (e.g., where the lateral motion signature is detected/classified using a predetermined model). In an example, the motion signature is a pair of opposite sign lateral accelerations. In a second example, the motion signature is a pair of opposite sign lateral accelerations, wherein the pair of opposite sign accelerations occur consecutively and within a frequency bandwidth, wherein high frequency vibrations above the frequency bandwidth are filtered out of the sensor dataset (e.g., neglecting high frequencies such as may be generated from a phone vibrating within a cupholder or in response to receiving a text message, for example; such as vibrations with a frequency above: 50 Hz, 100 Hz, 1000 Hz, etc.), wherein the motion signature comprises higher-frequency peaks, within the frequency bandwidth, which occurring along a lower-frequency acceleration signal below the frequency bandwidth (e.g., lateral acceleration signal associated with the vehicle tracking the road curvature, etc.). In one variant, at least one lateral movement event is detected based on a higher-frequency peak within a lower-frequency signal (e.g., a pair of peaks of opposite sign). In an example, the lower-frequency signal corresponds to the lateral acceleration (and/or angular velocity/acceleration) associated with a roadway curvature, wherein the higher-frequency peak corresponds to a lane change maneuver.

However, the set of lateral events and/or outcomes associated therewith can be otherwise determined.

Additionally or alternatively, S500 can include any other suitable processes.

4.6 Method—Triggering an Action Based on the Set of Lateral Event Outcomes S600

The method 200 can optionally include triggering an action based on the set of lateral event outcomes S600, which functions to respond to a determination that a user has been driving in an aggressive and/or risky fashion. This can in turn function to appropriately and/or dynamically set an insurance premium for the user, prevent the risk of a collision, protect the driver and/or other users from harm, deduce insights into particularly risky driving environments, and/or can perform any other functions. In variants, S600 can occur at least partially based on (and/or in response to) checking for criteria, wherein the action is triggered based on satisfaction of one or more criteria. For example, actions can be triggered in response to satisfaction of a set of lateral deviation criteria (e.g., satisfaction of a severity threshold, lane change frequency threshold, driver aggression threshold, risk score threshold, etc.). However, actions can alternatively be triggered periodically (e.g., weekly), at the end of a driving trip, in response to a remote (pull) request, in response to a user request (e.g., at the mobile device) and/or with any other suitable frequency/timing.

Examples of actions include any or all of: calculating and/or updating a score (e.g., driver score), training and/or retraining a model, alerting a user (e.g., the driver, an insurance company associated with the driver, an employer [e.g., trucking company, rideshare service, public transit entity, etc.] associated with the driver, other drivers on the road near a risky driver, a passenger in the vehicle, etc.; via a push notification or alert on the mobile device; during a driving trip, after a driving trip, etc.), triggering an emergency response (e.g., alerting an ambulance of the vehicle's location and suspected accident, contacting the driver, contacting a family member of the driver, etc.), triggering an alert (e.g., to the driver, to a family member of the driver, to other drivers on the road, etc.), updating a score associated with a route and/or location driven by the driver, and/or any other actions.

In one variant, S600 can include providing driver feedback based on the lateral event outcomes such as updating a driver risk score, providing in-trip driver statistics/parameters, and/or any other suitable characterizations of a mobile device user (driver) based on the trip.

In one variant, S600 can include providing user/driver feedback based on a risk score (e.g., such as described in U.S. application Ser. No. 14/566,408, filed 10 Dec. 2014, which is incorporated herein in its entirety by this reference) which is determined based on the set of lateral event outcomes (e.g., risk score for a trip, updated driver risk score, etc.).

However, any other suitable action can be triggered based on the set of lateral event outcomes. Alternatively, no action can be triggered based on the set of lateral event outcomes, or actions can be otherwise suitably triggered for the method.

The method 200 can additionally or alternatively include any other processes.

Although omitted for conciseness, the preferred embodiments include every combination and permutation of the various system components and the various method processes, wherein the method processes can be performed in any suitable order, sequentially or concurrently.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

Additional or alternative embodiments implement the above methods and/or processing modules in non-public transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-public transitory computer readable media, or any suitable device. The computer-executable component can include a computing system and/or processing system (e.g., including one or more collocated or distributed, remote or local processors) connected to the non-public transitory computer-readable medium, such as CPUs, GPUs, TPUS, microprocessors, or ASICs, but the instructions can alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method, comprising:

detecting a vehicle trip for a vehicle with a mobile device;

at the mobile device, determining a first dataset, the first dataset comprising movement data collected with at least one inertial sensor of the mobile device;

using a first model, extracting features from the first dataset;

based on the extracted features, determining a lateral acceleration metric corresponding to vehicle lane change behavior during the vehicle trip, wherein:

the lateral acceleration metric includes a higher-frequency peak within a lower-frequency lateral acceleration signal, the higher-frequency peak corresponds to a lane change maneuver, and the lower-frequency lateral acceleration signal corresponds to a roadway curvature;

based on the lateral acceleration metric satisfying a set of lateral deviation criteria, determining an update to a driver score, wherein the lateral acceleration metric satisfies the set of lateral deviation criteria based on detecting a motion signature, wherein the motion signature comprises a pair of opposite sign lateral accelerations; and triggering an action at the mobile device based on the update to the driver score.

2. The method of claim 1, wherein the lateral acceleration metric is associated with a frequency and severity of lane changes.

3. The method of claim 1, further comprising:

based on the first dataset, detecting a set of in-hand motion events associated with user interaction with the mobile device; and filtering, out of the first dataset, portions of the first dataset associated with the detected set of in-hand motion events.

4. The method of claim 1, wherein the features are extracted for portions of the vehicle trip in which the mobile device is classified as stationary relative to the vehicle.

5. The method of claim 1, wherein the lateral acceleration metric is determined with a pretrained machine learning (ML) classifier or tree-based heuristic classifier.

6. The method of claim 1, wherein the lateral acceleration metric is further determined based on an angular velocity or a heading.

7. The method of claim 1, wherein triggering the action at the mobile device comprises causing a driver score alert to be presented to a user at the mobile device, and the driver score alert comprises the update to the driver score.

8. The method of claim 1, wherein triggering the action at the mobile device comprises updating a location score indicating a riskiness of a location associated with the vehicle trip.

9. The method of claim 1, wherein triggering the action at the mobile device comprises updating a scenario score indicating a riskiness of a scenario associated with the vehicle trip.

10. A method, comprising:

with sensors of a mobile device, collecting a sensor dataset comprising movement data from at least one inertial sensor of the mobile device;

with the sensor dataset, detecting a vehicle trip based on longitudinal vehicle movement substantially aligned with a longitudinal axis of a vehicle;

at the mobile device, extracting a set of data features from the movement data during a period of the vehicle trip;

detecting a set of lateral movement events based on the set of data features, the set of lateral movement events associated with lateral deviations relative to the longitudinal vehicle movement, wherein:

the set of lateral movement events are detected based on a motion signature of lane change behavior, the motion signature comprising a pair of opposite sign lateral accelerations; and at least one lateral movement event is detected as a higher-frequency peak within a lower-frequency lateral acceleration signal, wherein:

the higher-frequency peak corresponds to a lane change maneuver, and the lower-frequency lateral acceleration signal corresponds to a roadway curvature:

based on the set of lateral movement events satisfying a set of lateral deviation criteria, determining an update to a driver score; and triggering an action based on the update to the driver score.

11. The method of claim 10, wherein the movement data comprises GPS data and inertial data, wherein the set of data features comprises a vehicle heading estimate, estimated by fusing the GPS data with the inertial data, wherein the lateral deviations comprise heading adjustments estimated with the inertial data.

12. The method of claim 10, further comprising: based on the sensor dataset, classifying the mobile device as stationary relative to the vehicle during at least one portion of the vehicle trip, wherein the features are extracted for the at least one portion of the vehicle trip in which the mobile device is classified as stationary relative to the vehicle.

13. The method of claim 10, wherein the action comprises providing driver feedback via the mobile device, the driver feedback comprising the update to the driver score.

14. The method of claim 10, further comprising determining a severity score for the set of lateral movement events based on a magnitude of the lateral deviations, wherein the action is triggered based on the severity score satisfying a threshold.

15. The method of claim 10, wherein the set of lateral movement events comprises a set of lane change events.

16. The method of claim 10, wherein the pair of opposite sign lateral accelerations occur consecutively and within a frequency bandwidth, wherein the motion signature comprises higher-frequency peaks, within the frequency bandwidth, which occur along a lower-frequency signal below the frequency bandwidth.

17. The method of claim 10, wherein checking for a set of lateral deviation criteria comprises determining an angle associated with the lateral deviations is below a full turn threshold.

18. The method of claim 10, wherein checking for a set of lateral deviation criteria comprises determining an angle associated with the lateral deviations is above a minor correction threshold.

19. The method of claim 10, wherein the set of lateral movement events based on the set of data features is detected with a pretrained machine learning (ML) classifier or tree-based heuristic classifier.

20. The method of claim 10, wherein triggering the action at the mobile device comprises updating a location score indicating a riskiness of a location associated with the vehicle trip.

* * * * *